United States Patent
Freedman et al.

(10) Patent No.: US 8,204,884 B2
(45) Date of Patent: *Jun. 19, 2012

(54) METHOD, APPARATUS AND SYSTEM FOR CAPTURING AND ANALYZING INTERACTION BASED CONTENT

(75) Inventors: Ilan Freedman, Petach Tiqwa (IL); Yair Dolev, Matan (IL); Talia Falik, Kfar-Sava (IL); Oren Pereg, Ra'anana (IL); Moshe Wasserblat, Maccabim (IL); Gili Aharoni, Ramat-Hasharon (IL); Eytan Bar, Even Yehuda (IL); Shai Shermister, Ra'anana (IL); Lior Arussy, Livingston, NJ (US); Yifat Meidav, Ra'anana (IL)

(73) Assignee: Nice Systems Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 13/098,504

(22) Filed: May 2, 2011

(65) Prior Publication Data

US 2011/0206198 A1    Aug. 25, 2011

Related U.S. Application Data

(62) Division of application No. 10/484,107, filed on Jul. 14, 2004, now Pat. No. 7,953,219.

(51) Int. Cl.
*G06F 17/30* (2006.01)
(52) U.S. Cl. .............. 707/737; 707/749; 379/265.06
(58) Field of Classification Search ............. 379/265.06, 379/265; 707/703, 702, 737, 749; 709/203
See application file for complete search history.

(56) References Cited

U.S. PATENT DOCUMENTS

| | | | | |
|---|---|---|---|---|
| 4,145,715 A * | 3/1979 | Clever | .......................... | 348/150 |
| 4,527,151 A * | 7/1985 | Byrne | .......................... | 340/554 |
| 4,821,118 A * | 4/1989 | Lafreniere | ................... | 348/156 |
| 5,051,827 A * | 9/1991 | Fairhurst | ....................... | 348/180 |
| 5,091,780 A * | 2/1992 | Pomerleau | .................... | 348/152 |
| 5,303,045 A * | 4/1994 | Richards et al. | .............. | 348/443 |
| 5,307,170 A * | 4/1994 | Itsumi et al. | ............... | 348/219.1 |
| 5,353,618 A * | 10/1994 | Roper et al. | ...................... | 72/58 |
| 5,404,170 A * | 4/1995 | Keating | ........................ | 348/443 |
| 5,491,511 A * | 2/1996 | Odle | .............................. | 348/153 |
| 5,519,446 A * | 5/1996 | Lee | ................................ | 348/556 |
| 5,734,441 A * | 3/1998 | Kondo et al. | ................. | 348/700 |
| 5,742,349 A * | 4/1998 | Choi et al. | .................... | 348/443 |
| 5,751,346 A * | 5/1998 | Dozier et al. | ................. | 348/153 |
| 5,790,096 A * | 8/1998 | Hill, Jr. | ......................... | 345/600 |
| 5,790,798 A * | 8/1998 | Beckett et al. | ................ | 709/224 |
| 5,796,439 A * | 8/1998 | Hewett et al. | ................. | 348/459 |
| 5,847,755 A * | 12/1998 | Wixson et al. | ................ | 348/149 |
| 5,895,453 A * | 4/1999 | Cook | .............................. | 705/22 |
| 5,920,338 A * | 7/1999 | Katz | .............................. | 348/150 |

(Continued)

FOREIGN PATENT DOCUMENTS

EP    0833489 A2 *   1/1998

*Primary Examiner* — Sherief Badawi
(74) *Attorney, Agent, or Firm* — Soroker Agmon

(57) ABSTRACT

An apparatus and methods for capturing and analyzing customer interactions the apparatus comprising interaction information units, interaction meta-data information units associated with each of the interaction information units, a rule based analysis engine component for receiving the interaction information, an adaptive database, an interaction capture and storage component for capturing interaction information, a multi segment interaction capture device, an initial set up and calibration device and a pre processing and content extraction device.

15 Claims, 12 Drawing Sheets

U.S. PATENT DOCUMENTS

| | | | |
|---|---|---|---|
| 6,014,647 A * | 1/2000 | Nizzari et al. | 705/39 |
| 6,028,626 A * | 2/2000 | Aviv | 348/152 |
| 6,031,573 A * | 2/2000 | MacCormack et al. | 375/240.16 |
| 6,037,991 A * | 3/2000 | Thro et al. | 725/116 |
| 6,055,540 A * | 4/2000 | Snow et al. | 1/1 |
| 6,058,163 A * | 5/2000 | Pattison et al. | 379/265.06 |
| 6,067,357 A * | 5/2000 | Kishinsky et al. | 379/265.02 |
| 6,067,517 A * | 5/2000 | Bahl et al. | 704/256.4 |
| 6,070,142 A * | 5/2000 | McDonough et al. | 705/7.14 |
| 6,081,606 A * | 6/2000 | Hansen et al. | 382/107 |
| 6,092,197 A * | 7/2000 | Coueignoux | 726/21 |
| 6,094,227 A * | 7/2000 | Guimier | 348/459 |
| 6,097,429 A * | 8/2000 | Seeley et al. | 348/154 |
| 6,098,066 A * | 8/2000 | Snow et al. | 1/1 |
| 6,111,610 A * | 8/2000 | Faroudja | 348/441 |
| 6,134,530 A * | 10/2000 | Bunting et al. | 705/7.25 |
| 6,138,139 A * | 10/2000 | Beck et al. | 709/202 |
| 6,167,395 A * | 12/2000 | Beck et al. | 1/1 |
| 6,170,011 B1 * | 1/2001 | Macleod Beck et al. | 709/224 |
| 6,178,239 B1 * | 1/2001 | Kishinsky et al. | 379/266.07 |
| 6,185,550 B1 * | 2/2001 | Snow et al. | 1/1 |
| 6,212,178 B1 * | 4/2001 | Beck et al. | 370/352 |
| 6,230,197 B1 * | 5/2001 | Beck et al. | 709/223 |
| 6,246,752 B1 * | 6/2001 | Bscheider et al. | 379/88.22 |
| 6,249,570 B1 * | 6/2001 | Glowny et al. | 379/88.22 |
| 6,252,946 B1 * | 6/2001 | Glowny et al. | 379/88.22 |
| 6,252,947 B1 * | 6/2001 | Diamond et al. | 379/88.22 |
| 6,295,367 B1 * | 9/2001 | Crabtree et al. | 382/103 |
| 6,327,343 B1 * | 12/2001 | Epstein et al. | 379/88.01 |
| 6,330,025 B1 * | 12/2001 | Arazi et al. | 348/143 |
| 6,345,305 B1 * | 2/2002 | Beck et al. | 709/242 |
| 6,370,574 B1 * | 4/2002 | House et al. | 709/224 |
| 6,404,857 B1 * | 6/2002 | Blair et al. | 379/67.1 |
| 6,427,137 B2 * | 7/2002 | Petrushin | 704/273 |
| 6,441,734 B1 * | 8/2002 | Gutta et al. | 340/541 |
| 6,477,533 B2 * | 11/2002 | Schiff et al. | 705/14.4 |
| 6,510,220 B1 * | 1/2003 | Beckett et al. | 379/265.06 |
| 6,526,397 B2 * | 2/2003 | Chee et al. | 1/1 |
| 6,549,613 B1 * | 4/2003 | Dikmen | 379/70 |
| 6,559,769 B2 * | 5/2003 | Anthony et al. | 340/541 |
| 6,563,920 B1 * | 5/2003 | Flockhart et al. | 379/265.1 |
| 6,570,608 B1 * | 5/2003 | Tserng | 348/143 |
| 6,604,108 B1 * | 8/2003 | Nitahara | 1/1 |
| 6,614,903 B1 * | 9/2003 | Flockhart et al. | 379/265.12 |
| 6,628,835 B1 * | 9/2003 | Brill et al. | 382/226 |
| 6,633,640 B1 * | 10/2003 | Cohen et al. | 379/265.03 |
| 6,651,042 B1 * | 11/2003 | Field et al. | 704/270 |
| 6,661,889 B1 * | 12/2003 | Flockhart et al. | 379/265.05 |
| 6,704,409 B1 * | 3/2004 | Dilip et al. | 379/265.02 |
| 6,711,585 B1 * | 3/2004 | Copperman et al. | 1/1 |
| 6,728,345 B2 * | 4/2004 | Glowny et al. | 379/88.22 |
| 6,757,361 B2 * | 6/2004 | Blair et al. | 379/67.1 |
| 6,785,369 B2 * | 8/2004 | Diamond et al. | 379/88.22 |
| 6,785,370 B2 * | 8/2004 | Glowny et al. | 379/88.22 |
| 6,898,277 B1 * | 5/2005 | Meteer et al. | 379/265.02 |
| 6,937,706 B2 * | 8/2005 | Bscheider et al. | 379/88.22 |
| 7,015,945 B1 * | 3/2006 | Sullivan | 348/150 |
| 7,076,427 B2 * | 7/2006 | Scarano et al. | 704/270 |
| 7,103,806 B1 * | 9/2006 | Horvitz | 714/43 |
| 7,203,285 B2 * | 4/2007 | Blair | 379/32.01 |
| 7,336,779 B2 * | 2/2008 | Boyer et al. | 379/265.02 |
| 7,401,087 B2 * | 7/2008 | Copperman et al. | 707/737 |
| 7,415,417 B2 * | 8/2008 | Boyer et al. | 705/346 |
| 2001/0040942 A1 * | 11/2001 | Glowny et al. | 379/88.22 |
| 2001/0043685 A1 * | 11/2001 | Bscheider et al. | 379/88.22 |
| 2001/0043697 A1 * | 11/2001 | Cox et al. | 379/265.06 |
| 2001/0052081 A1 * | 12/2001 | McKibben et al. | 713/201 |
| 2001/0054064 A1 * | 12/2001 | Kannan | 709/203 |
| 2001/0055372 A1 * | 12/2001 | Glowny et al. | 379/88.22 |
| 2002/0005898 A1 * | 1/2002 | Kawada et al. | 348/149 |
| 2002/0010705 A1 * | 1/2002 | Park et al. | 707/104.1 |
| 2002/0022977 A1 * | 2/2002 | Schiff et al. | 705/5 |
| 2002/0035616 A1 * | 3/2002 | Diamond et al. | 709/219 |
| 2002/0059283 A1 * | 5/2002 | Shapiro et al. | 707/100 |
| 2002/0087385 A1 * | 7/2002 | Vincent | 705/10 |
| 2002/0143609 A1 * | 10/2002 | Magouirk et al. | 705/10 |
| 2002/0198775 A1 * | 12/2002 | Ryan | 705/14 |
| 2003/0059016 A1 * | 3/2003 | Lieberman et al. | 379/201.03 |
| 2003/0078782 A1 * | 4/2003 | Blair | 704/270.1 |
| 2003/0128099 A1 * | 7/2003 | Cockerham | 340/5.7 |
| 2003/0129986 A1 * | 7/2003 | Blair et al. | 455/450 |
| 2003/0163360 A1 * | 8/2003 | Galvin | 705/8 |
| 2004/0012540 A1 * | 1/2004 | Treibitz et al. | 345/2.2 |
| 2004/0024739 A1 * | 2/2004 | Copperman et al. | 707/1 |
| 2004/0098295 A1 * | 5/2004 | Sarlay et al. | 705/8 |
| 2004/0141508 A1 * | 7/2004 | Schoeneberger et al. | 370/401 |
| 2004/0161133 A1 * | 8/2004 | Elazar et al. | 382/115 |
| 2004/0249650 A1 * | 12/2004 | Freedman et al. | 705/1 |
| 2005/0015286 A1 * | 1/2005 | Rudnik et al. | 705/7 |
| 2005/0030374 A1 * | 2/2005 | Goldenberg et al. | 348/143 |
| 2005/0125437 A1 * | 6/2005 | Cardno | 707/102 |
| 2006/0089837 A1 * | 4/2006 | Adar et al. | 705/1 |
| 2006/0093135 A1 * | 5/2006 | Fiatal et al. | 380/28 |
| 2006/0262922 A1 * | 11/2006 | Margulies et al. | 379/265.12 |
| 2007/0033221 A1 * | 2/2007 | Copperman et al. | 707/103 R |
| 2007/0055694 A1 * | 3/2007 | Ruge et al. | 707/104.1 |
| 2007/0217576 A1 * | 9/2007 | Blair | 379/1.01 |
| 2008/0107255 A1 * | 5/2008 | Geva et al. | 379/265.06 |
| 2008/0152122 A1 * | 6/2008 | Idan et al. | 379/265.07 |
| 2008/0181417 A1 * | 7/2008 | Pereg et al. | 381/17 |
| 2008/0240374 A1 * | 10/2008 | Conway et al. | 379/67.1 |
| 2008/0240404 A1 * | 10/2008 | Conway et al. | 379/265.06 |
| 2008/0240405 A1 * | 10/2008 | Conway et al. | 379/265.06 |

* cited by examiner

METHOD, APPARATUS AND SYSTEM FOR CAPTURING AND ANALYZING INTERACTION BASED CONTENT

RELATED APPLICATIONS

The current application is a divisional filing of application Ser. No. 10/484,107 dated Jul. 14, 2004 the disclosure of which is incorporated herein by reference.

The present invention relates and claims priority from U.S. provisional patent application Ser. No. 60/350,345 titled IDEA MANAGEMENT BASED ON CONTENT OF INTERACTION, filed 24 Jan. 2002 and from U.S. provisional patent application Ser. No. 60/306,142 titled CUSTOMER INTERACTION CONTENT BASED APPLICATIONS, filed 19 Jul. 2001.

The present invention relates to U.S. patent application Ser. No. 60/259,158 titled CONTENT-BASED ANALYSIS AND STORAGE MANAGEMENT, filed 3 Jan. 2001, and to U.S. provisional patent application Ser. No. 60/354,209 titled ALARM SYSTEM BASED ON VIDEO ANALYSIS, filed 6 Feb. 2002 and to U.S. provisional patent application Ser. No. 60/274,658 titled A METHOD FOR CAPTURING, ANALYZING AND RECORDING THE CUSTOMER SERVICE REPRESENTATIVE ACTIVITIES filed 12 Mar. 2001 and to PCT patent application serial number PCT/IL02/00197 titled A METHOD FOR CAPTURING, ANALYZING AND RECORDING THE CUSTOMER SERVICE REPRESENTATIVE ACTIVITIES filed 12 Mar. 2002 and to PCT patent application titled CONTENT-BASED STORAGE MANAGEMENT filed 3 Jan. 2002, and to U.S. provisional patent application Ser. No. 60/227,478 titled SYSTEM AND METHOD FOR CAPTURING, ANALYZING AND RECORDING SCREEN EVENTS filed 24 Aug. 2000 and to PCT patent application titled SYSTEM AND METHOD FOR CAPTURING BROWSER SESSIONS AND USER ACTIONS filed 24 Aug. 2001, and U.S. patent application Ser. No. 10/056,049 titled VIDEO AND AUDIO CONTENT ANALYSIS filed 30 Jan. 2001, and US provisional patent application titled RECORDING OF FACE TO FACE CLIENT-AGENT MEETING, filed 6 Sep. 2001, the content of which is hereby incorporated by reference.

BACKGROUND OF THE INVENTION

1. Field of the Invention

The present invention relates to data analysis storage, retrieval and analysis, in general and to a method, apparatus and system for capturing and analyzing customer interactions including customer and business experience, intelligence and content, in particular.

2. Discussion of the Related Art

Many organizations are involved in generating interactions with customers or other businesses. Many organizations capture or collect such interactions, storing potentially vast volumes media. Examples of such organizations are call centers across many industries, financial trading floors, intelligence surveillance systems, and public safety, emergency and law enforcement entities.

To a limited extent, people, through playback of recordings and listening to interactions, perceive and sometimes document the content of such media. Nevertheless, the details passed in voice and other forms of interactions are largely lost simply due to the size of interaction volume, and the vast majority is not put to use, even when captured. Businesses are looking at their interactions with customers and other businesses as a major source for information and insight about customers and business operations. Increasingly, businesses are striving to keep a closer touch with the customers and "listen" to what customers have to say, believing this will provide a competitive advantage in the market place.

The overwhelming amounts of information collected by organizations require a structured approach if proper management is to be achieved, with the processes to develop a finely-honed content "distillery", and the right tools to qualify, tag, sort reveal the relevant data. One example where large amounts of information are collected is the field of Customer Relationship Management (CRM). CRM is a business strategy whose outcomes optimize profitability; revenue and customer satisfaction by organizing around customer segments, fostering customer-satisfying behaviors and implementing customer centric processes. CRM should enable greater customer insight, increased customer access, effective customer interactions, and integration throughout all customer channels and back-office enterprise functions.

A substantial portion of CRM is Analytical CRM or Business Analytics (customer and business intelligence). Customer and business intelligence is the use of various data mining, databases, data warehouse and data-mart technologies on customer information and transactional data to create a better understanding of the customer. Such understanding is used to leverage a company's efforts to retain, up-sell and cross-sell a specific customer. It is also a major cornerstone for personalization of content and segmentation of customers leading to improved one-to-one marketing efforts and overall performance. A major portion of the interaction between a modern business and its customers are conducted via the Call Center or Contact Center. Interactions with the business' customers and prospects take the form of telephone and additional media such as e-mail, web chat, collaborative browsing, shared whiteboards, Voice over IP (VoIP) and the like. The additional media captured by the Call Center has transformed the Call Center into a Contact Center captured not only traditional phone calls, but also multimedia contacts.

The ability to capture digitized voice, screen and data is now available in Call Centers and Contact Centers. Such capturing abilities are typically used for compliance purposes, when such recording of the interactions is required by law or other means of regulation, risk management, limiting the businesses' legal exposure due to false allegations regarding the content of the interaction, or for quality assurance, using the re-creation of the interaction to evaluate an agent's performance. Other businesses areas where capturing digital data is becoming increasingly important are: betting and gambling, entertainment, dealing for personal accounts, frauds and money laundering, alternative dispute resolution, mobile telephones, tapping, front-running and the like. It should be emphasized that the call centers and the financial trading arenas are two distinct vertical markets.

Known analytical CRM focuses its analysis on the transactional data created by transaction processing systems such as the CRM platform or the Enterprise Resource Planning (ERP) system. Such analysis is not performed on the content of the interaction with the customer. Simply put, such systems fail to make use of all the information exchanged during the interaction. One example is a direct insurance service and a phone inquiry. Through advertisement, customers contact the insurance service business. Due to legal requirements the insurance service sends the insurance forms to the customer and have the customer sign them and mail them back to close the deal. Often customers call back to clarify contract details. When customers are handled, the type of call is classified and categorized in the data system, such as CRM and the like. Such call is categorized into one of a set of predefined criteria and a transactional piece of data is created. Such piece of data can include date and time, customer name or ID, agent name or ID, insurance policy number, other call related data such as duration, direction, and the call classification from a list of predefined categories. The call classification could be for example "contract clarification" or "contract inquiry". In some cases the agent might add to the transactional data some free-form text that might or might not indicate the specific clause that the customer asked about. Current analytical solutions analyze transactional data, and as such would not yield information regarding the cause of inquiries regarding the contract. This means that while the system is recording such calls it is not using the information stored in connection with the call, which also includes the call content and the CRM record or screen event. Requesting the agents to provide deeper and more thorough "observations" of the interaction and its contents would interfere with their main task of responding to customer queries thus reducing their capability to handle calls and increasing the call centers' cost per call. In addition, the unpredictable nature of providing observations calls for improved judgmental skills, which incur sustained training and level adjustment costs. Screen events are the events identified by a system in response to one or more of the following: actions performed by the agent in association with the use of a system as viewed by the agent on the screen display including but not limited to keyboard press, mouse click, etc.; data entered into all or part (Region Of Interest) of the display or non-displayed window (window might not be in focus); operating system screen related events. Such as the Esc button pressed, etc; pre-defined multi-sequence events. Such as entering the amount in window application A can generate an update in certain reduction field in Application B. Only these dependant occurrences would yield either input or trigger for the analysis process.

In addition, current systems do not provide for analyzing interactions and at the same time analyze associated data or other interactions. Thus, for example, interactions made and recorded by traders who trade on financial floors are not fully analyzed. Similarly, interactions recorded by call center and contact center agents are not fully analyzed. Information received and logged is not fully understood because parts of such information is not processed and associated with actions of the agents. The result is a deficiency in exploitation of information and data recorded. The person skilled in the art will appreciate that there is therefore a need for a new and novel method and system for capturing and analyzing content.

SUMMARY OF THE PRESENT INVENTION

It is an object of the present invention to provide a novel method, apparatus and system for capturing and analyzing content derived from customer interactions, which overcomes the disadvantages of the prior art.

In accordance with the present invention, there is thus provided an apparatus for capturing and analyzing customer interactions the apparatus comprising interaction information units, interaction meta-data information associated with each of the interaction information units, a rule based analysis engine component for receiving the interaction information, and an adaptive database. The apparatus further comprises an interaction capture and storage component for capturing interaction information. The rule based analysis engine component receives interaction meta-data information. The apparatus further comprises a customer relationship management application. The adaptive database can be a knowledge base component, a telephony integration component which may be accessed via a network. The interaction is a communication unit through which content is passed or exchanged. The interaction can be a telephone conversation, audio, video, voice over IP, data packets, screen events, e-mails, chat messages, text, surveys' results, quality management forms results, collaborative browsing results or sessions, e-mail messages or any coded data. The meta-data information is information related to the interaction information and passed over a media; each interaction has associated meta-data. The interaction and the associated meta-data may originate internal or external to the content analysis system and internal or external to the organization and is the primary input to the system. The adaptive database can be a customer relationship management database, or a computer telephony integration information database or a knowledge database or other databases in the organization or outside the organization. The rule based analysis engine component may be conditionally activated based on a predetermined rule or event. The apparatus can further comprise an intermediate storage area having an intermediate format wherein the results of the analysis made by the rule based analysis engine are stored on and used by or exported to the applications. The results of the analysis made by the rule based analysis engine are provided to and update the adaptive database. The results of the analysis made by the rule based analysis engine provide the user with selective operations based on the results of the analysis. The rule based analysis engine receives from an adaptive database predetermined rules used for analysis. The results of the analysis made by the rule based analysis engine update or create rules used by the rule based analysis engine. The interaction capture and storage component is also comprised of a computing device designed to log, capture and store information. The interaction capture and storage component also comprises a buffer area for intermediate storage of the interaction information. The interaction capture and storage component also provides the rule based analysis engine at least two interactions and at least one interaction meta-data associated with each of the at least two interactions stored in the interaction capture and storage component or stored in an adaptive database. The interaction capture and storage component also comprise an administrative database utilized for the setting up, initialization and operational follow up of the apparatus. The interaction capture and storage component can trigger recording of an interaction or a portion thereof in response to a predetermined event or rule. It is also comprised of an administrative database that operates according to rules base on the content of the interaction.

In accordance with the present invention, there is also provided an apparatus for capturing and analyzing customer interactions the apparatus comprising a multi segment interaction capture device, an initial set up and calibration device and a pre processing and content extraction device. The apparatus also comprises a rule based analysis engine and an interaction raw database for storing interactions captured by the multi segment interaction capture device and an interaction meta-data database wherein each interaction stored in the interaction raw database is associated with an interaction meta-data stored in the interaction meta-data database. Another database is the content data items database. In one preferred embodiment the rule based analysis engine is a software device operative to perform rule check on at least two data items stored in any of the following: the content data items database, the interaction raw database, the interaction meta-data database, the knowledge base, the CRM database. The results of the rule check are made available to applications. The apparatus is also comprised of an interpretation device for imposing rules on the rules based analysis engine.

In accordance with the present invention, there is also provided a method for capturing and analyzing customer interactions the method comprising pre-processing of interactions previously captured; the pre-processing stage comprising: identification; filtration; and classification of interactions; extracting selected content data items from the interactions. The identification is accomplished by examination of at least two interactions. The identification is accomplished by examination of meta-data associated with the interactions. The identification is accomplished by examination of at least one of the following: computer telephony interaction information or CRM information or knowledge base information or information extracted from an adaptive database.

In accordance with the present invention, there is also provided a method for capturing and analyzing customer interactions the method comprising a rule based analysis engine receiving at least one predetermined rule for the identification of at least two predetermined content data item; the rule based analysis engine sampling the at least two content data items from a database or interactions and associated data. The step of associating at least two or more interactions or content data items captured in compliance with at least one predetermined rule by the rule based analysis engine. The step of creating a content data item by the pre processing and content extraction device. The step of capturing interactions by a multi segment interaction capture device. The step of performing at least one adaptive operation on data by an initial set up and calibration device whereby the calibration of the appropriate configuration is customer or market segment tailored. The step of monitoring of an interaction or portion thereof in response to a predetermined event or rule. The step of activating the pre processing and content extraction device based on a predetermined rule or event. The step of updating any one of the following: an interaction raw database; an interaction meta-data database; a knowledge base, a CRM database, a computer telephony integration database with the results of the analysis. The step of providing an indication as to the result of the rule check. The step of imposing rules on the rules based analysis engine.

In accordance with the present invention, there is also provided in a customer service environment of an organization, a system for detecting and processing idea-related data, the system comprising: an interaction monitoring module for monitoring content of interactions; an subject-related managing module for detecting and processing subject-related data, the subject managing module comprising content analyzing tools for analyzing the interactions content. The system also comprises a quality management module for analyzing and evaluating the subject-related data. The idea managing module further comprises a module for sending a notification to an agent involved in an agent-customer interaction upon detecting an idea-related data in said interaction thereby assuring the agent inserts the subject-related data into customer service environment. The quality management module generates idea-related data customer surveys thereby providing further analysis to members of an organization.

BRIEF DESCRIPTION OF THE DRAWINGS

The present invention will be understood and appreciated more fully from the following detailed description taken in conjunction with the drawings in which:

FIG. 2B shows a more detailed apparatus of the content analysis system;

DETAILED DESCRIPTION OF THE PREFERRED EMBODIMENT

Figure 1:
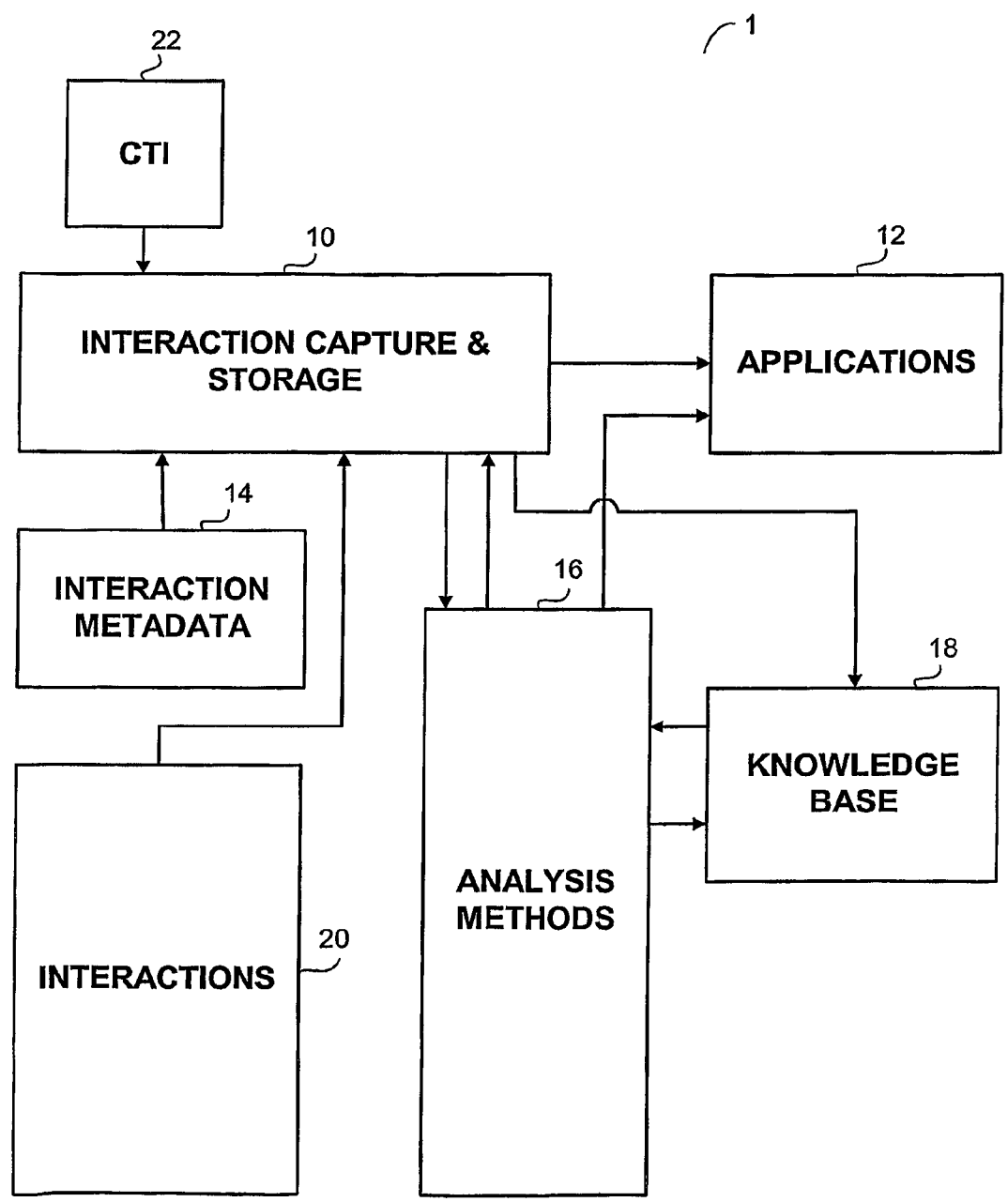
FIG. 1 is shows a high level diagram of the content analysis system.

The present invention discloses a new method, apparatus and system for capturing and analyzing content derived from customer interactions. This present invention provides for a coherent, integrative analysis process for the contents of all forms of customer communications.

Various environments use the capturing of information and data from agents. Such may include call centers, contact centers, trading floors, money foreign exchange centers or trade centers, and other institutions such as banks, back and front offices in various centers. Two distinct environments are the call centers and the trading floors.

Call centers, also known as the factory floor of the $21^{st}$ century, are centers where customer and other telephone calls are handled by an organization. Typically, a call center has the ability to handle a considerable volume of calls at the same time, to screen calls and forward them to someone qualified to handle them, and to log calls. Telemarketing companies, computer product help desks, and any large organization that uses the telephone to sell or service products and services may use call centers. Agents supervised by managers and supervisors often man such centers of floors.

Trading floors are the call centers of the financial world. Typically, a trade floor has the same ability as a call center, with the exception that regulatory requirements mandate that calls are always logged and traders are constantly supervised by compliance officers and chief traders. Traders man trading floors. The government is increasingly regulating the operation of traders and trading floors. Various legal requirements are placed on the traders to deal fairly and to avoid irregularities in their dealings.

The person skilled in the art will appreciate that while various market and regulatory conditions may affect and apply to agents or traders, the present invention may be implemented in connection with both environments and any like environment. To enable a better understanding of the present invention the term agent shall also refer to traders in the reminder of the text below.

It is the business concern that agents work efficiently and avoid misconduct, misuse of the system or clients or irregularities in their work abilities and output. Information while the agent performs his duties may assist the manager or supervisor to determine that the agent or traders perform adequately and that the business avoids legal liability due to malpractice or regulation violation. The present invention provides a system for the analysis of at least two interactions captured as a result of the agent's interaction with the client. Analyzing more then one interaction enables system according to the present invention to effectively monitor the interactions between the agent and the client. Such interactions may take place between a business and a customer or between businesses. The interactions captured can be associated there with each other and with other information already present in the organization, such as the organization knowledge base. The interactions may also be associated with data received about the capturing of the interaction such as Computer Telephony Integration (CTI) information or various other data pertaining to the manner of recording and logging of the interaction. One non-limiting example is the information provided as to the length of a call a chat session, the source of the call or the chat session (telephone number or IP address or e-mail identifier) to be associated with what was said (through voice or otherwise) by an agent or a customer.

Recent dynamic changes in the environments mentioned above for a system to be able to capture, analyze and identify inefficiencies, malpractices, misconduct, pattern and customer or agent behavior, quality issues, causes of dispute, regulatory violations in real time and the like. For example, because agents may become vulnerable to third party inducement to accept gifts in exchange for conducting actions that are not in the best interest of the organization, monitoring particular irregularities in the agent activities are paramount to the business. In this non limiting example the voice of the agent can be analyzed to determine patterns of over friendliness or to identify particular words and at the same time screen events or content from the agent's screen may be analyzed to determine if particular favors or reductions or tips are offered to the client. Moreover, recent research has shown that abuse of illicit or restricted substances among agents is on the rise. Analyzing the agent's voice in association with the speed at which the agent is operating his CRM application (which is captured directly or indirectly) can indicate a problem and alert the management. Businesses operating call centers and contact centers face the same concerns and problems. Another non-limiting example, in places where dealing for personal account is permitted, management should control, monitor and detect cases such as "front running", where an agent could execute a personal trade in advance of a client's or institutional order to benefit from an anticipated movement in the market. The agent's screen activity together with the order for execution of the trade, are captured such that behavior of the agent is verified along with the sequence of execution. Any indications of irregularity will alert the management that bad practice occurred. Moreover, businesses are constantly anxious to gain a competitive edge over their competitors by having better agents, which perform best. The performance of agents may be analyzed effectively through the capture and analysis of various data associated with the interaction with the client. The present invention provides for such a system.

Referring now to FIG. 1 where a high level diagram of a content analysis system is shown. The system 1 describes a process flow, starting from interactions and ending in applications making use of the processed and analyzed information. The system includes at least interactions information 20, an interaction meta-data information 14, an interaction capture and storage component (ICS) 10, a rule based analysis engine component 16, a knowledge base component 18, and CTI component 22. A sub component of the knowledge base component 18 could be a customer relationship management application or any dynamic or adaptive database internal or external to the organization. The database may be located remotely to the organization and accessed via local or wide area networks. The interactions 20 are a business-to-consumer or a business-to-business interaction unit and include diverse types of communication through which content is passed or exchanged. Non-limiting examples of interactions are telephone conversation, audio, video, voice over IP, data packets, screen events, e-mails, chat messages, text, surveys' results, quality management forms results, collaborative browsing results or sessions, e-mail messages, any coded data and the like. The various types of communications supported will be described in detail in association with the following drawings. The meta-data information component 14 is a set of descriptive and associative information, which are related to the actual interaction information 20 passed over the media where each interaction type has associated meta-data. Examples of meta-data associated with each interaction type will be described in detail in association with the following drawings. Interactions 20 and their associated meta-data 14 originate external to the content analysis system and are the primary input to the system. Interactions 20 are captured by the ICS component 10. The ICS component 10 is also referred to in the text of this document as the Multi-Segment Interaction Capture component. Examples of the ICS components 10 can include the NiceLog, the NiceCLS components by NICE Systems of Raanana, Israel. The ICS component 10 can comprise of a transient memory device such as a transient buffer used solely to buffer the interactions 20 into a rule based analysis engine component 16. Persons skilled in the art will appreciate that other like systems are interchangeable. Subsequent of being captured the interactions 20 data is fed to the analysis methods component 16. Optionally, interactions 20 information could be first stored on the ICS component 10 having a substantially flexible buffer area for some or all of the interaction types/media types when real-time processing of the interactions data is problematic or impractical. The ICS component 10 feeds the analysis methods component 16, which is responsible for the analysis process. Data from diverse additional information sources utilized to enhance the interactions information 20 are fed simultaneously to the analysis methods component 16. For example, information concerning an enterprise, such as products, strategy, sales statistics, agent performance and the like, is fed from the Knowledge Base component 22. Another important source comprising information about the interaction is the CTI information 22. CTI is the use of computers to manage telephone calls. CTI can provide information about calls and the callers, including telephone numbers, length of calls, type of call, and the like. CTI can provide a multitude of information including the length of the call, the calling number, the extension number, the agent ID, the customer Id, and the like. CTI can be extensively used to obtain important information to be used in association with the present invention. CTI provides reasonably accurate information and is therefore used as a primary source of information by the present invention. Customer Relationship Management (CRM) information, such as a customer's profile, the customer's history and interaction summary notes introduced by a customer service representative is represented by the CRM application 18. For example, one CRM system that could be used in association with the content analysis system is the eBusiness Applications by Siebel Systems, Inc. of San Mateo, Calif. The results of the analysis are stored in an intermediate or permanent storage area having a specific intermediate format on the in ICS component 10 to be used in turn by the applications 12. Applications 12 can be any internal or external computer based hardware or software application that utilizes the results of the analysis or is activated or activates the analysis in response to requests. The intermediate storage could typically be a part of a recording and archival system. The storage device can include a DAT tape, a hard disk, a memory device, a magnetic media storage device, and other like storage devices that store information in a permanent, transient or intermediate form. In addition, to feeding the applications 12 the results of the analysis could feed the CRM applications 18 as well. The ICS component 10 further includes an administrative database utilized for the setting up, the initialization and operational follow up of the system. The administrative database is further utilized to facilitate authorization and verification procedures via stored user information, such as agent identification and the like.

Figure 2A:
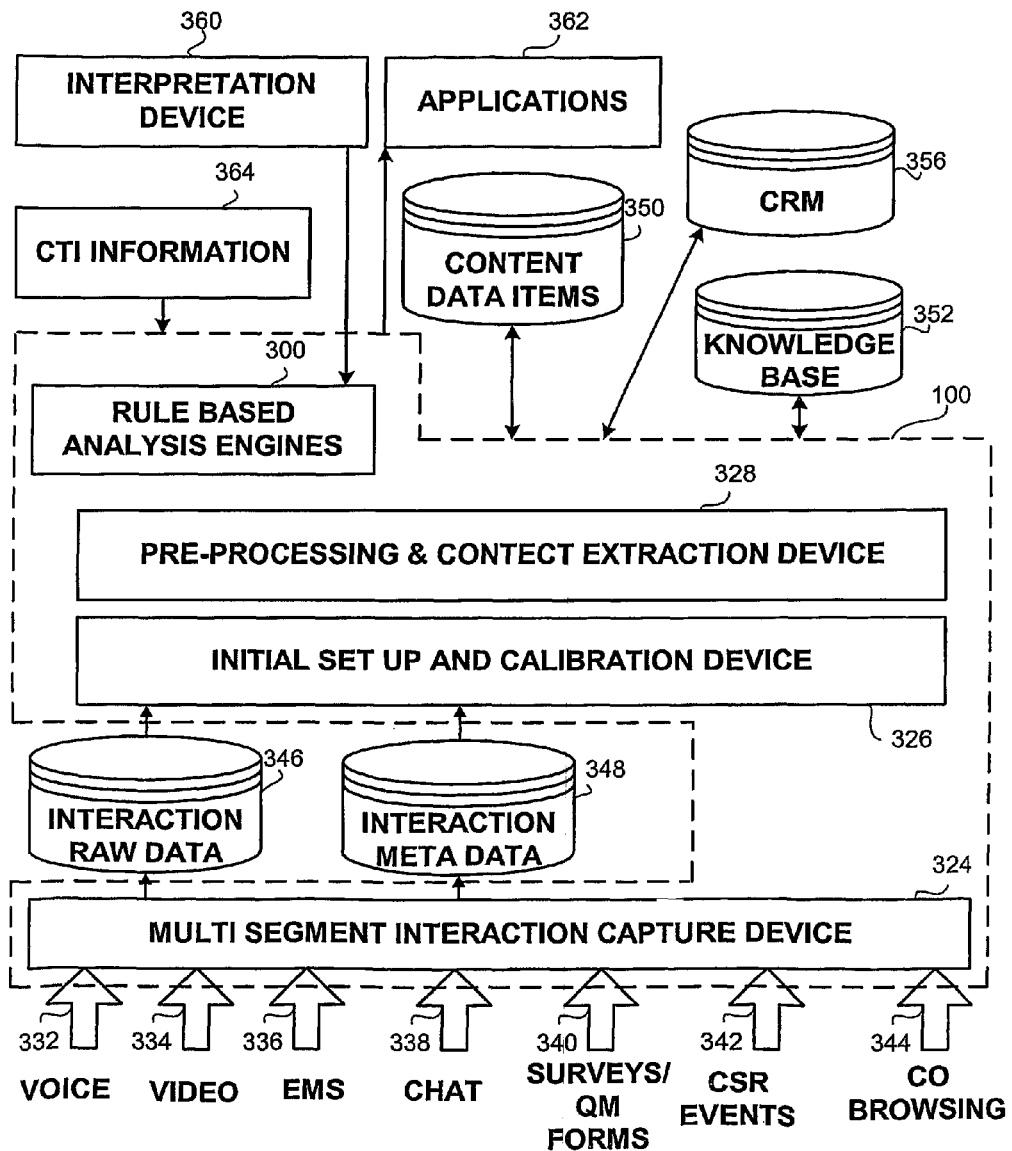
FIG. 2A shows an exemplary high level diagram of an apparatus employing the content analysis system, in accordance with a preferred embodiment of the present invention.

Referring now to FIG. 2A where an exemplary high-level diagram of an apparatus employing the content analysis system is shown. The apparatus 100 is generally comprised of a multi segment interaction capture device 324, an initial set up and calibration device 326, a pre processing and content extraction device 328 and a rule based analysis engine 300. The multi segment interaction capture device 324 is operative to receive numerous interactions from various sources such as voice 332, video 334, e-mail services 336, chat messages 338 (preferably in the form of TCP/IP packets), results from surveys and from quality management forms 340, screen captures 342, and collaborative web browsing 344. Interactions captured by the multi segment interaction capture device 324 are stored to the interaction raw data database 346. Each data item in the interaction raw database 346 is associated with an interaction meta-data stored in the interaction meta-data database 348. The initial set up and calibration device 326 performs adaptive operations on the data stored in the interaction raw database 346 and the interaction meta-data database 348. As a result a calibration of the appropriate configuration is provided to comply with the customer needs, in particular, and with the vertical market segment, in general. Pre processing and content extraction device 328 extracts data from various databases available, such as the interaction raw database 346, the interaction meta-data database 348, the organization's knowledge base 352, the organization's CRM database 356 and CTI information 364. Pre processing and content extraction device 328 performs pre processing of the information and determines whether particular interactions are suitable to be further analyzed or not. For example, short voice interactions wherein the client or customer and the agent do not speak are cut out in some cases. The same non-speech interactions may however be measured and made available for analysis if they are over a certain length of time. Similarly, screen captures showing no change are omitted and time wherein the screen is unchanged may be used for later analysis seeking ultimately to assess the agent's performance. In another non limiting example, the pre processing device 328 may discard of video footage showing a complete black screen or discard e-mails which do not belong to the parties monitored and have arrived by mistake or through spam to the agent monitored. Likewise, chat sessions may be edited to eliminate chat robots (BOTs) intervention or non-parties chat messages. By employing a pre processing stage the content analysis system substantially reduces the size of the content data items 350 database size and the cost on computer resources in analyzing superfluous interactions. The pre-processing device enables the content analysis system to reach better results in a shorter time, serving as the selective primary filter of the system. At any given time during the pre processing the pre-processing device 328 may update the knowledge base or the CRM databases 352, 356 as a result of the pre-processing outcome. Data items not discarded are put in a format suitable to be used in association with the rule based analysis engine 300 and are stored in the content data items database 350. The rule based analysis engine 300 is a software device operative to perform rule checks on various content data items. Rules are predetermined by the user or are adaptive in accordance with the system's performance and demands. Initially, rules may be entered as a set of predetermined templates. One such non-limiting example is the rule "filter the word BUY and CRM update of BUY_PRODUCT_X field". Another non-limiting example of a rule is "filter all calls from telephone number (123)-1234567 having at least one of the words "GIFT", "BET", "GAMBLE" and call made to agent ID #890". Rules are also imposed by the interpretation device 360 which include content classification trees and rules. The rule engine device 300 may obtain data from other sources such as the knowledge base database 352 and the CRM database 356 and the CTI information 364. The results of the analysis performed by the rule engine are made available to various applications 362 for the purpose of alerting the management or supervisors as to the results of the analysis. Users such as agents may also initiate the analysis manually. The location of each of the components of the present apparatus may reside in a single location or over a distributed network of computers. Information may be passed from one device to another or from a database to a device over computer busses, local area networks, and wide area networks, the Internet and over other networks, including a cellular network.

Figure 2B:
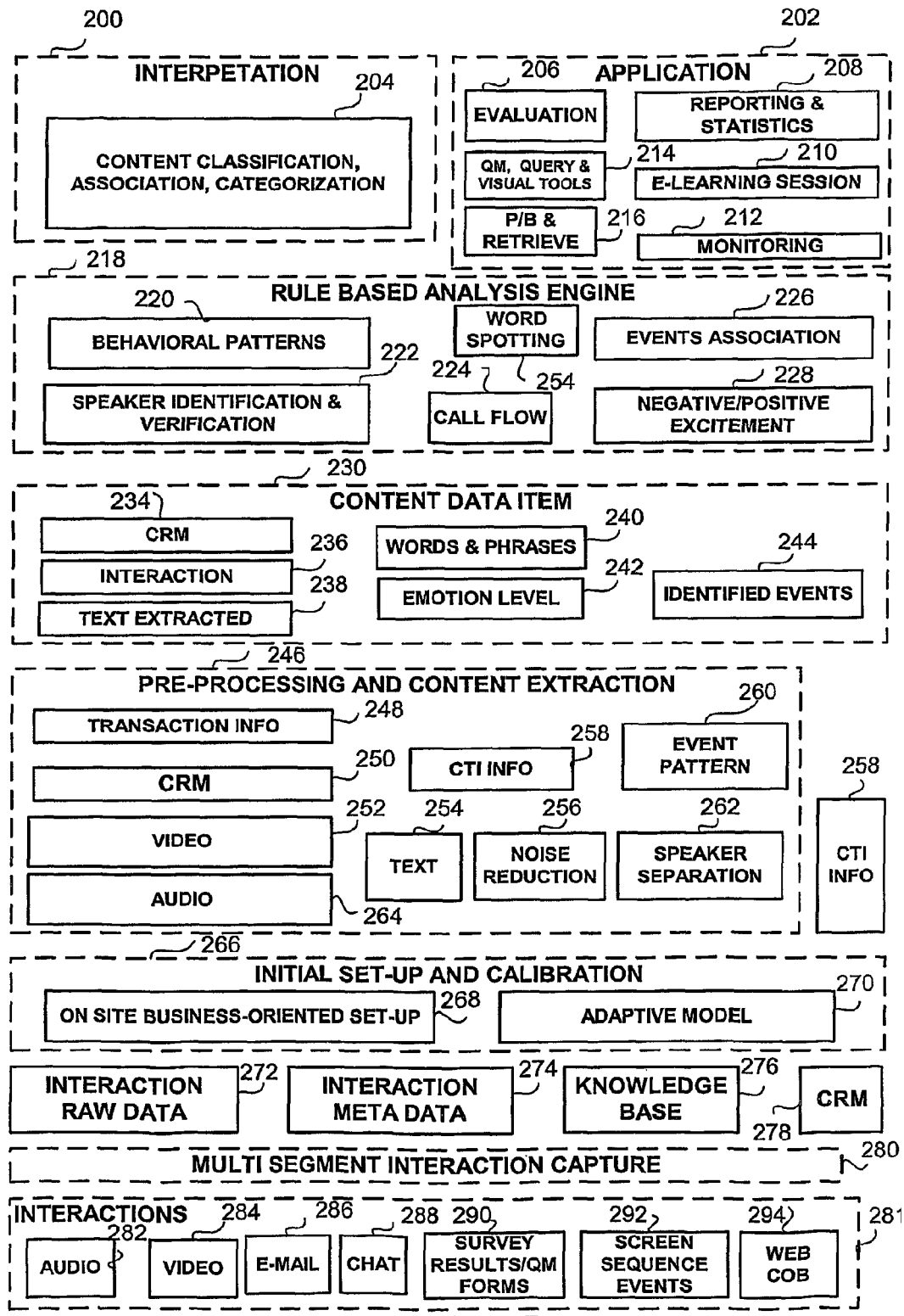
FIG. 2B shows an exemplary high-level diagram of an apparatus employing the content analysis system in accordance with a preferred embodiment of the present invention.

Referring now to FIG. 2B which shows in greater detail another exemplary apparatus using the high level components of the content analysis system as presented on FIGS. 1 and 2A. The apparatus comprises several components, which enable the capturing and analysis of the interactions. The interactions 281 includes examples of multi-media communication information (interactions). The initial setup and calibration device 266 is calibrated according to the interactions 281 types found on the particular site. For example, insurance call centers will be adapted to recognize words prevalent in the insurance industry and airlines call centers will be adapted to recognize words used and of interest to the supervisors of such industry. The configuration/setup may be accomplished on site in order to make sure that the functionality of the system corresponds to the requirements of the customer and the environment. The result would be the on site business oriented set up module 268. For example, in trading floors a set of common words, such as buy, shares, call option, trader, and the like, would be introduced during a setup in order to enhance the Word spotting engine result. Similarly words such as gift, bet, alcohol and other like words may be screened for. Another example relates to the conflict of interest that arises if traders are permitted to deal for themselves in those commodities, instruments or products related to the ones in which they deal for their institution. In case dealing for personal account is permitted management should be able control and monitor and detect abuse cases such as "front-running", where an employee could execute a personal trade in advance of a client's or institutional order to benefit from an anticipated movement in the market. The trader's screen activity together with the order for execution of the trade, are captured such that behavior of the employee is verified along the sequence of execution. The system will alert the management when an indication of irregularity or bad practice is identified. As shown in association with FIG. 2A additional interaction criteria may be set up as part of the setup procedure. Furthermore, during the lifetime of the system, calibration can be performed adaptively through the adaptive module 270 according to the site's profile and accumulated changes. Interaction meta-data device 274 represents the meta-data captured and stored by ICS device 280. Device 280 can be presented as a multi segment interaction capture device since it can capture any information segments in a coded data format. Examples of different types of data sources include but are not limited to video data 284, audio data 282, including voice communications data, such as voice over IP (VoIP), streaming audio data and audio recorded in walk-in centers and any other type of audio-related data, SMS messages, MMS messages (Multimedia Service), instant messages, e-mail messages 286 with or without attachments, collaborative web browsing 294, chat 288 and other type of messaging systems messages, documents transmitted by facsimile, customer surveys 290, user interface data, including screen multi-sequence events 292, and the like. The ICS device 280 additionally contains a content data Item 230 or a link to a database containing the content data items 230 resulting from the pre-processing and content extraction device 246. The pre processing and content extraction device 246 extracts the interactions stored in the interaction raw data and meta data 272, 274 and identifies data later to be analyzed by processing transaction information 248, CRM information 250, video information 252 through the use of subject/object extraction, text information 254, noise information 256 including the reduction of noise from the surrounding area or created in the process of propagation of the media, speaker separation 262, event pattern 260, CTI information 258 and audio 264 which can include word and phrase spotting, emotion detection and activity detection and other measurable parameters in the voice. Once processed the information is either discarded or converted into a content data item 230. As a result of the processing the system may update the CRM, CTI, Knowledge Base or other database in the organization. The content data Item 230 may include CRM data 234, interaction information 236 which may include various interaction raw data and associated meta-data, extracted text 238, analysis core sub-units such as words and phrases 240, emotion level 242, and identified events 244 and the like. Elements from the pre processing and content extraction component 246 can also or alternatively be located in the ruled based analysis engine 218.

Still referring to FIG. 2B the rule based analysis engine 218 constitutes the functional kernel of the system. Other devices may be regarded as sub devices of the rule based analysis engine 218. Such include the following sub-devices: the pre-processing and content extraction sub-device 246, the rule-based analysis sub-device 218 and the content interpretation sub-device 200. The rule based analysis engine 218 applies rule based analysis to content data items provided thereto. The rules device 218 include the analysis of behavioral patterns device 220, the speaker identification and verification device 222, the call flow analysis device 224, the excitement (or emotion) analysis device 228 and the events association device 226. It should be pointed out that the events association enables the present system to analyze two or more data items relating to the same interaction at the same time or two or more interactions based upon different content data items. The interpretation device 200 includes the content, classification, association and categorization device 204 which provides the rule based analysis engine 218 with tree like vertices and hedges which may be used by the rule engine 218 in associating data items therewith or with additional information. The categories and classifications may also determine the make up of rules or the behavior of rules, which are dependent on the vertices and hedges defined. So, for example, the appearance of the word "bet" may be associated through classification with the use of the word "gambling" and while only one word will be embodied in a specific rule, the rule engine will filter both for when such rule is applied. The application tools 202 are utilized by the user to perform Quality Management (QM) evaluation 206, QM, Query and visualization rules tools 214, Query Playback and Retrieval 216, report and statistics generation 208, E-learning agent sessions 210 and real time monitoring 212.

The proposed system and method provide advanced analysis capabilities. In order to demonstrate the concept of the invention, the following exemplary scenario will be assumed via which the functionality of the various devices and components of the apparatus will be described. In the exemplary scenario a customer using the proposed system and method desires to find out the reason for the unusual success of a specific human agent. First, an audio classification module 264 of the pre-processing and content extraction sub-device 246 extracts words and sentences 240 that the agent uses, then the agent's recurrent behavioral patterns are detected. Reference is made to Banter RME from Banter, Inc. located in San Francisco, Calif., which provide a tool for word extraction from text. The agent's screen activities 292 are captured as well during the interactions and the inner conversational emotional level 242 is identified. All the above-identified interactions content information is first captured by the multi segment interaction capture device 280 and then saved to the interaction raw data database 272 and interaction meta-data database 274. It is then processed by the pre processing and content extraction device 246 and saved as a content data item 230 later to be further analyzed by the content-analysis rule base engine 218 to produce a result.

Each of the interactions may be linked with another type of interaction and the relationship matched and analyzed. Exemplary agent-specific results that were derived could include agent-specific behavioral characteristics, such as courtesy, conversational manner, cooperation, and operating methods such as collaborative web browsing and proper use of the CRM application. The above scenario is a particular case of automatically analyzing an agent's conduct regarding behavioral characteristics while handling customers for purposes of Quality Management. The CRM database 278 serves as a source for supplying Transactional Information required during the analysis process. The results of the analysis could be fed back to the CRM database 278. Another source of vital information used by the analysis process is the enterprise knowledge database 276. The database 276 is commonly used for retrieving organization related information, such as products information, agent QM information, agent profiles, multi-media parameters, and the like. Notably, CTI information 258 is used during the analysis process to allow real time content analysis. Call information is received either from the Automatic Call Distributor (ACD) or from the ACD through the CTI. Call information coming from the ACD can be used in monitoring agent activity while the agent is engaged in interaction with a customer. Call information can also arrive from a Turret system, also known as a Dealer Board or from a PBX system. An exemplary benefit of the above option was described in detail in the referenced co-pending U.S. provisional patent application Ser. No. 60/350,345 titled IDEA MANAGEMENT BASED ON CONTENT OF INTERACTION, filed 24 Jan. 2002, the contents of which is incorporated herein by reference and in association with the description of FIG. 11. CTI information is of import because it is substantially accurate and can provide information about the length of the call, the calling number and the called is number and extension through the Dial Number Identification Service, the agent, and customer Ids, the customer classification and the like. Once the system has received CTI information it is better able to both pre process interactions and later performs rule-based analysis leading to enhanced results. CTI is utilized in association with other transactional information such as CRM data as inputs to the real-time or the off-line analysis process.

Figure 3:
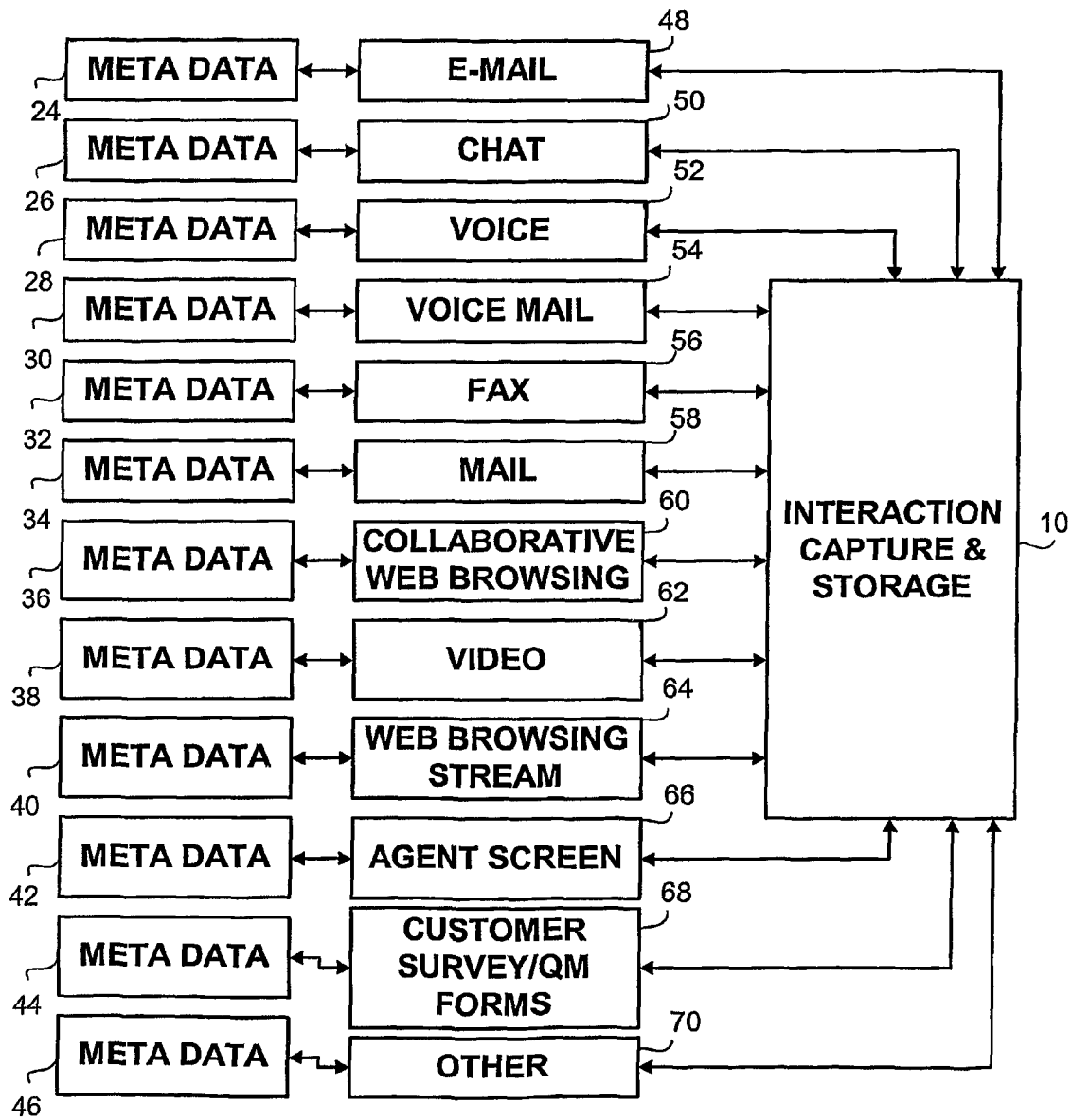
FIG. 3 is a block diagram showing the interactions, in accordance with a preferred embodiment of the present invention.

Referring now to FIG. 3, the interactions are enabled via the implementation of a suit of existing commercial products. Interactions performed via the products are captured and stored on a software-based or hardware-based and/or firmware ICS component 10. Each interaction type, whether digital or analog, 48, 50, 52, 54, 56, 58, 60, 62, 64, 66, 68, 70 is performed through a suitable application and through a distinct type of media associated with its respective meta-data 24, 26, 28, 30, 32, 34, 36, 38, 40, 42, 44, 46. The interaction types performed via the commercial products include but are not limited to the following: a) E-mail 48, carrying e-mail body and associated meta-data fields. The body includes text and attached electronic documents while the meta-data consist of information and attributes, such as addresses (From, To, CC, BCC, Reply To, and the like), subject, sensitivity, system in which the e-mail was created, handling procedures, date and time of creation, sending, reception, and the like. b) Interactive Web-chat sessions 50 including "transactional" sessions having text introduced and transmitted by each participant in turn. c) Voice conversations 52 also performed in actual face-to-face meetings, for example involving a service or a product offer, over a telephone or a cellular connection, or by using voice-over-IP telephony (VoIP), d) Voice messages or voice mail 54. e) Facsimile messages 56, carrying electronic images of one or more transmitted documents. f) Traditional mail 58 written, typed and physically sent via conventional mail-delivery channels with associated attached documents. g) Collaborative Web browsing 60 generating an ordered list of URLs, of web pages loaded, filled-in texts, click streams, application documents and whiteboard contents. h) Video interaction 62, such as an telephone or Internet video-conference. I) Web browsing stream 64, which is a detailed record of a customer's interaction with the enterprise's Web site supporting self-service sessions, purchasing sessions, and the like. The record contains the exact trail of the Web pages visited, the contents of the visited pages, filled-in information, ordered click streams, and the like. j) Agent computing device screen 66 that contains information transferred by other media/sources, such as transactional information from a CRM, which is related to one or more of the above interaction types. During and subsequent to the interactions, the agent's computing device screen contains useful information not only about the interaction but also about the manner in which the agent handles the interaction. This information includes graphical display content and a detailed record of the user's input activities in the computing device operating environment. For example, user action in a windowing operating system environment, such as MS-Windows includes closing, moving and opening windows, window controls, control contents, window captions, keyboard typing, pointer device movements and pointer device activations. These actions are captured by the identification of specific operating system events and through the recording of the screens. The capturing agent action is fully described in the co-pending patent application incorporated herein by reference. k) Customer survey 68, such as a Post Call Survey, is generated either in real-time where the customer is requested to answer post call predefined questions or link to a unified resource locator containing such questions, or off-line via the transmission of e-mail messages and the like, subsequent to the termination of the call session between the participants where the customer is being asked to fill out a survey including questions related to the contents and course of the interaction. In like fashion quality management forms are generated automatically or manually once the agent has performed an action. Quality management forms are evaluation forms filled by supervisors, evaluating the agent skills and the agent quality of service. Such forms will be correlated with the content data item during the analysis to deduce certain results. The quality management form can be automatically filled by the system in response to actions taken by the agent and/or fields filled by the agent or interactions captured. l) Other interactions 70 include any future prospective interaction types as long as an appropriate capture method and processing method is implemented. Such can be dynamic content, data received from external sources such as the customer or other businesses, and any like or additional interactions. Still referring to FIG. 3, the interaction content is captured and further used by the interaction and storage unit 10 in order to provide the option of handling directly the original content. Optionally previously stored, absorbed content analysis results are being used as input information to an ongoing content analysis process. For example, the behavioral pattern of an agent and/or a customer may be updated due to the previously stored content extracted recurrent behavioral pattern. The various types of interactions may be re-assessed in light of previous interactions and interactions associated therewith. The output of the analysis can be tuned by setting thresholds, or by combing results of one or more analysis methods, thus filtering selective results with greater probability of success.

Figure 4:
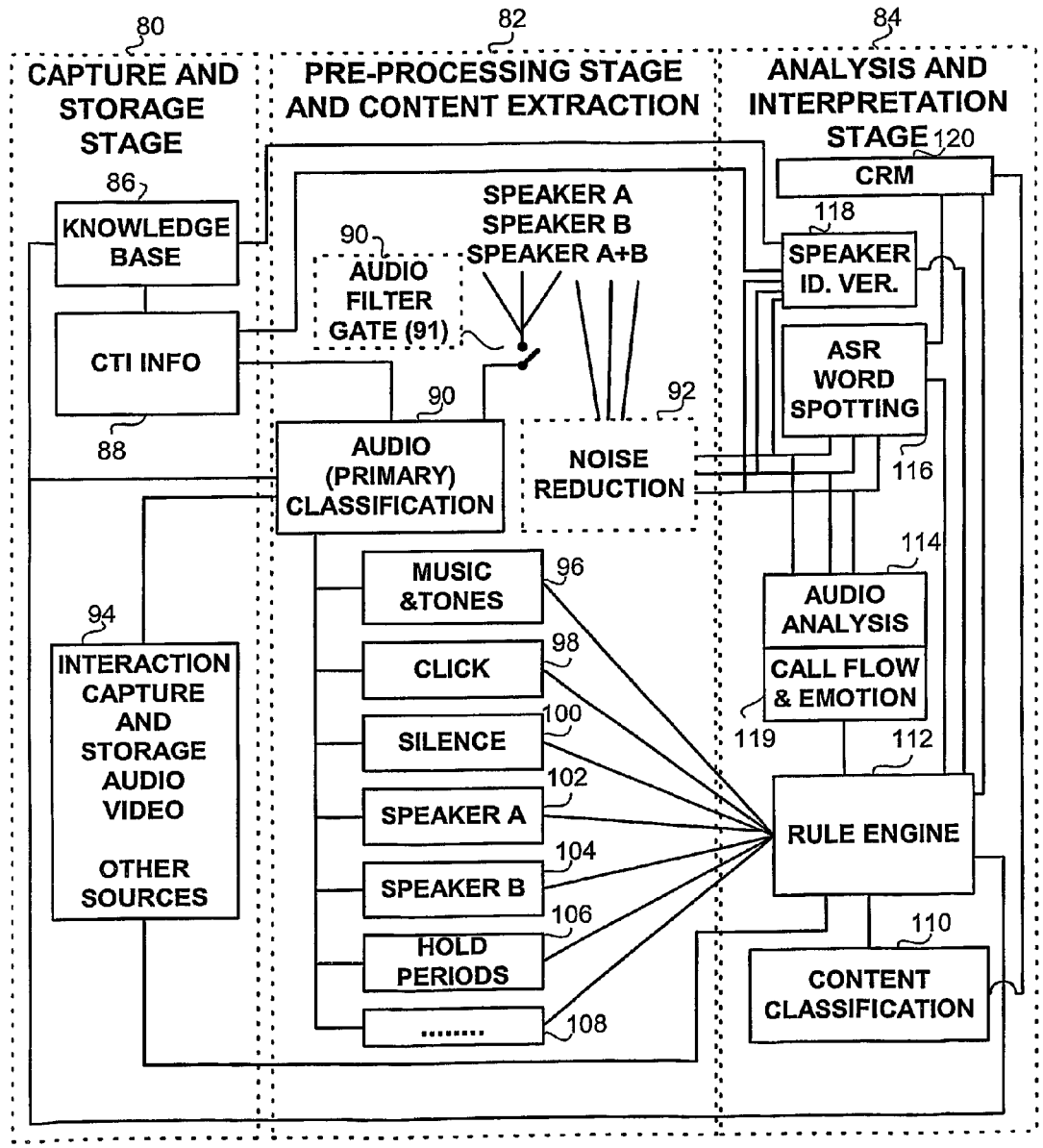
FIG. 4 is a block diagram of the internal modules of an exemplary content analysis system with particular emphasis on the analysis of an audio type interaction, in accordance with a preferred embodiment of the present invention.

Now referring to FIG. 4 which is a block diagram of the internal modules of an exemplary content analysis system with particular emphasis on the analysis of an audio type interaction. It will be clear to the person skilled in the art that FIG. 4 serves as an operative example to the system shown in FIGS. 1, 2A, 2B. The person skilled in the art will appreciate that like systems can be accomplished in the context of the present invention in association with the processing and analysis of other interactions. The capture and storage stage 80, pre-processing and content extraction stage 82 and the analysis and content interpretation stage 84 are displayed with suitable inter-connectivity between the constituent functional modules. The analysis of audio signals using content-based audio information concerns typical situations where the interactions are characterized by low signal-to-noise ratio (SNR) and in the presence of substantially powerful interference sources. The pre-processing and content extraction stage 82 contains an audio classification module 90 that includes functions for automatic speech detection and speaker segmentation, an audio filtering gate 91 to select audio segments suitable for further analysis and optionally a noise reduction software module 92 for noise reduction. The audio classification module 90 utilizes a speech detection function in order to enable the system to identify and distinguish speech signal scenario from several inherently integrated speech elements, such as music and tones 96, transient signals (the noise produced by the passing of transportation vehicles in the vicinity), keyboard clicks 98, footsteps (not shown), noise and silence 100 and other noises 108. While distinguishing between speech signal and silence is a straightforward task it becomes complicated in cases where unknown powerful interference sources are present at low SNR's. To provide a simplified example, a speaker whose voice is transmitted over a phone line will be considered. The Audio classification module 90 is required first to identify the speech scenario whether the signal is contaminated by specific background noise like music or aloof speakers and if contaminated the signals is required to be filtered in order to reduce the background noise and eliminate the interferences. Consequent to the pre-processing stage the audio is ready for the analysis and it is performed by the Audio Speech Recognition (ASR) module 116.

Still referring to FIG. 4 the audio classification module 90 includes a speaker segmentation function to allow the system to identify and consequently to separate the speakers, such as participants in a conversation. The inherent elements of the conversation are captured from within the audio frame of a recorded conversation signal. For example, in order to analyze a conversation carried out between two participants and recorded over a telephone line the audio signal should preferably be segmented in order to provide for the suitable analysis. The separated pieces of the information hidden in the signal frames are individually processed. As a result different and inherently integrated participants and conversation elements, such as speaker A 102, speaker B 104, Speaker A+B 102, 104, can be considered individually. In addition segments including holds 106, noise, and silence 100 are also handled individually. The function is designed and developed in such a manner as to overcome situations where the recorded signal is contaminated by unknown interferences caused by for example, inferior quality of communication lines and non-ideal locations of microphone devices. The objective of the speaker segmentation function is to identify speech segments spoken by each speaker in an audio stream. The system uses speaker segmentation either to obtain more data from a particular speaker or to identify the points in time when each speaker is speaking. System speech recognition performances are improved by adapting the functions to the acoustic models using the data obtained a priori from a particular speaker.

The input to "speaker segmentation function" is a summed audio signal. Unsummed recorded audio can be summed or compressed or processed prior to being archived or used. In addition, and optionally, signal processing can be performed prior to recording of the audio signal, thus refraining from audio signal degradation that may occur during the recording session. Output includes the following signals or segments marked by a time index: a) signal 1 is a sequence of segments each of which belongs to speaker 1, b) signal N is a sequence of segments each of which belong to speaker N, c) non-voice, d) silence, and e) talk over. The function is both text independent and speaker independent. Integration of the speakers and an inherent acoustic model of the site significantly improve the segmentation performance. The same integration of the speakers could provide the use of the system for real-time applications, such as speaker-based trigger start recording, monitoring of speaker-based trigger starts, and the like. The system is configured to analyze specific parts of the call based on information from other applications and from other pre-processing functions, such as information from CTI events, speech detection and classification functions, and the like. The outputted results of the system are cross-referenced with the output of other systems in order to improve overall system performance. The person skilled in the art will appreciate that the above-described function is an example and that other variations to analyze and examine the audio or other types of interactions can be implemented as well in connection with the present invention.

Figure 10:
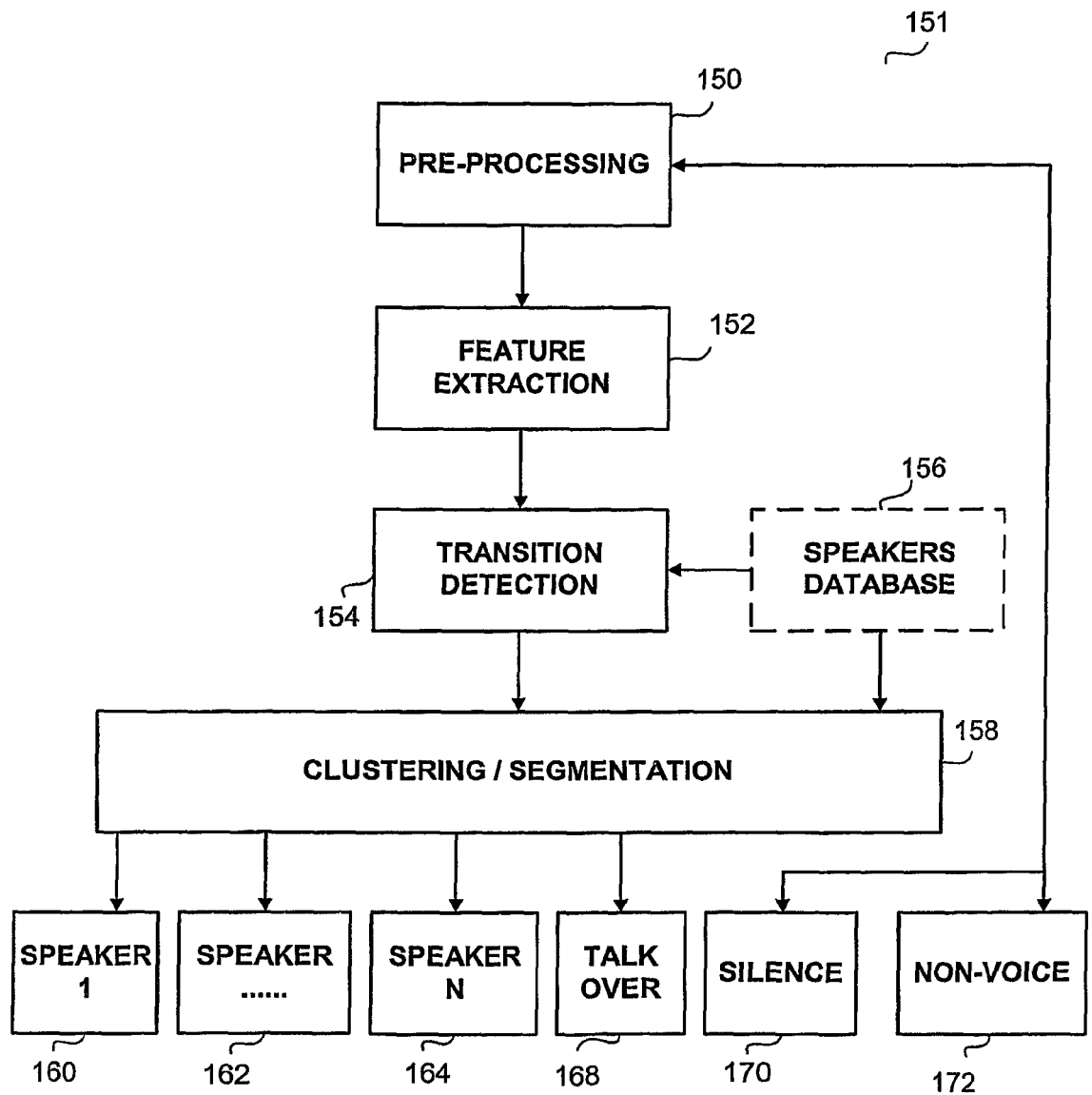
FIG. 10 is a flowchart of the segmentation function, in accordance with a preferred embodiment of the present invention.

Reference is made now to FIG. 10, which is a simplified flowchart of the speaker segmentation function. Subsequent to being called, the function 151 is performed across the processing steps 150 through 158. At step 150 several optional pre-processing functions are loaded and run. These additional functions are required to be executed prior to the performance of the segmentation analysis. For example, the pre-processing functions include noise reduction, audio classification, and the like. At step 152 spectral features vectors are extracted from the speech segments and silence and non-voice sectors are discarded. At step 154 all the candidate transition points representing specific statistical vector features measurement changes are found. These points imply speech turnovers and thus the transition from a specific speaker to another speaker is detected. The change of speakers is found by one or more specific indicators pointing to the transition. At step 158 the function independently and adaptively learns the number of clustering occurred in the examined voice track. Then the function applies the transition points found in the previous step to the clusters by statistical calculation. The clusters represent the output segmentation result, such as speaker 1 across N, and talk over. Note should be taken that the number of clustering could be received in the initialization stage. Optionally speaker information is stored in speaker database 156 and is retrieved when necessary by the function at the transition detection step 154 or the clustering and segmentation step 158.

Referring back now to FIG. 4, the speech noise reduction module 92 contains a software function that completes the pre-processing stage 82. The module 92 is utilized as the final reducer of the remaining noise resulting from interferences remaining after the speaker segmentation and the speech detection functions were performed.

The full specification of the speech noise reduction 92 function is described next. The noise reduction algorithm package comprises of three algorithms, each designed to cope with different noise features that might be expected. The three algorithms can be independently turned on and off, so that the expected noise(s) may be reduced while minimizing the damage to speech intelligibility—by disabling the algorithm(s) that may be irrelevant to the encountered noise features. Per each algorithm invoked, an operator-based level of operation (either Low, Medium or High) may be set, to realistically meet the noise's severity. This way, the trade-off of SNR and quality improvement vs. degradation in intelligibility may be set to near optimum, according to the encountered input SNR. The functions of the speech noise reduction algorithm are described next. A tone elimination algorithm is a part of the noise reduction function. The tone elimination algorithm is capable of eliminating, or reducing, noises that comprise of several (up to five) nearly "pure" tones over each 500 mS intervals, almost independently. The elimination is based on adaptive spectral detection of the tones' frequencies, and consequent notch filtering. The detection algorithm is based both on spectral observation of the processed block and on the past history of occurrence of the suspected tone in preceding blocks. In addition to "pure" continuous tones, the algorithm can detect short bursts of tones, usually typical to Morse or slow FSK background signals. The adaptive notch-filtering is implemented in the vicinity of the detected frequency, using a single (double-sided) zero and a single (double-sided) pole, thus implementing an ARMA (2, 2) linear filter. The filters are cascaded to sequentially operate on all the detected tones per 500 mS data block. The use of such filters enables local tracking of the eliminated tone, so as to prevent artificial generation of a tone where the disturbing tone is locally absent. Provision is made for the cascaded notch-filters to retain inter-segment signal continuity when the same tone frequencies are repeated. The humming sounds elimination algorithm is also a part of the noise reduction function. "Humming" sounds usually resemble time-domain impulse trains, reflected in frequency-domain impulse trains (possibly widened) that are stationary over relatively long periods (500 mS). Such noises are usually typical to HF environments, or to acoustic environments that are subjected to mechanical periodic sources such as low RPM engines, propellers etc. They are frequently accompanied by white or slightly colored noises. The detection of humming sounds is implemented using spectral detection of such trains that may be comprised of up to 400 elements in the spectrogram reflected in the FFT of the processed data block. Consequently, these trains are eliminated from the spectrogram, and the refined time-domain block is reconstructed from the modified spectrogram using an inverse FFT. The white noise elimination algorithm is also a part of the noise reduction function. Additive white (or slightly colored) noises are typically encountered in VHF environments, or remain as residues after the elimination of "humming" or tone-like noises. The well-known "spectral subtraction" technique is used with several modifications in order to reduce noises of this nature. The basic analysis is based on shorter (64 mS) data blocks than the previously discussed algorithms; however, considerable block overlapping and averaging efforts are made in both signal analysis and synthesis, to retain long-term continuity and consistency. The short-period analysis is necessary for relying on the expected short-term stationary of the desired speech signals. The spectral noise level is estimated using non-linear order-statistics approaches that minimize the effect of desired speech-like signals on the estimation error. The estimated level is then spectrally subtracted in a way that compromises the subtraction in an attempt to preserve speech information where it is apparently present. The detection and subtraction of the spectral noise-level is performed separately on four spectral sub-bands, thus allowing for slight variations in the noise's whiteness (at the expense of statistical accuracy), and increasing the algorithm's robustness. Each sub-band is processed using different processing parameters, to accommodate sub-band dependent trade-offs between quality and intelligibility. The main well-known drawback of the spectral subtraction method is the so-called "musical noise" artifact. Operator selection of operation level (Low, Medium, High) sets the processing parameters so as to meet the operators' preferred trade-offs between the original noise subtraction and the musical noise artifact.

Still referring to FIG. 4 the audio filtering gate module 91 decides which audio segments are eligible for further analysis and which are non-eligible. So for example, white noise and "humming" will not be eligible for further analysis and will be discarded. However, lengthy "humming" segments will be eligible for analysis for quality control and management purposes. Other parts such as music on hold and radio on hold and the like can also be removed as not suited for further analysis. Based on the audio classification module 90 results the system automatically predicts which audio segments will be suitable for analysis. As a result only specifically selected audio segments are fed to the analysis stage 84. At stage 84 a selective analysis is performed based on the quality of the pre-processing functions performed by the audio classification module 90. The pre-processing stage 82 allows modeling speech in the presence of severe interferences, such as background noises (music, footsteps, keyboard clicks, and other non-productive sounds), simultaneous speakers, cross talk, and the like. The functions extract sufficient speaker information, such as fluent call conversation characterized by relatively short speaker frames and with high speaker transition rates) as to allow reliable speaker segmentation, modeling and identification from complex contaminated signals. The pre-processing stage 82 supports both real-time and non real-time audio analysis. Still referring to FIG. 4, the CTI information 88 is used in the pre-processing stage 82 as a source for gathering real-time information such as hold periods, transfers, real time business interaction data, and the like. CTI information 88 may also be linked directly to audio streams captured. The audio information is captured by the ICS component 94 and undergoes pre-processing 82 and analysis 84. Consequent to the pre-processing stage 82 the pre-processed and "cleaned-up" audio segments are fed to the analysis and interpretation stage 84. The stage 84 receives the processed audio segments and begins analyzing the segments via the use of several parallel functions in association with the collected and cross-referenced real-time or off-line data received from the CTI information 88, the Knowledge Base 86 and the CRM information 120. The analysis process includes but not limited to a Speaker Identification and Verification function 118, a Word Spotting function 116, a Call Flow and Emotion function 119, a Content Analysis Rule engine 112, and a Content Classification module 110. The Speaker Identification and Verification function 118 is utilized to identify and verify the speaker. The function 118 uses CTI events correlated with an administrative database (not shown). The administrative database stores agent records including agent information, such as agent ID, privileges, agent association with groups, human resources information, agent profiles and the like. The function 118 further uses an external database, such as a CRM database, integrated with the system for the provision of customer identification. For example, following a call at a Call Center a specific agent responds to the call. As a result a CTI event is generated, such as a "start-call' event that includes the agent-specific ID or a pre-defined extension number. In accordance with the agent-specific ID assigned by the system or with the specific pre-defined extension number the agent participating in the call is immediately identified. The agent ID or the extension number is then further checked against the suitable records stored in the administration database 121 for the purposes of authentication and verification. Regarding the customer or the initiator of the call the system collects suitable ACD/CTI information, such as ANI, DNIS, area code, and the like, for identification and further correlates the identification with information from external sources such as CRM information that includes customer-specific, such as telephone number, e-mail address and the like and private information stored within the system, such as customer ID and customer profile. Preferably the speaker identification and verification function 118 is designed such as to be a part of the pre-processing stage 82. The Word Spotting function 116 is utilized to notice specific words and phrases of interest to the user. Words such as bet, drug, buy, alcohol and others may be filtered or monitored. In one embodiment of the invention an off-the-shelf commercial product may be used for word identification, such as for example the Philips Speak&Find, the Dragon MediaIndexer by ScanSoft, or the like. In addition several full-transcription tools are used and the resulting transcription is searched for the specific words. Such tools that could be used include, for example, Dragon NaturallySpeaking by ScanSoft, ViaVoice by IBM, SpeechPearl by Philips, or the like.

The system and method proposed by the present invention includes a specifically designed performance measurement tool for the word spotting function 116. This automatic tool is analyzing the effects of the software updates, parameter optimization and setting different words to spot. The function 166 input consists of two kinds of files: a) a searched word list, and b) a manually transcribed text file for each voice file. These files contain time stamps every pre-defined number of seconds for timing information resolution. The output of the function 116 is the results of the word spotting in terms of detections and false alarms. The results would include details of the software version, parameters checked and file ID for comparison and analysis purposes. The word spotting function 116 creates an estimated "real" word location (timing) list. Due to the timing information limitation of the transcribed files the list entries are in the following format: WORD FOUND--→ LAG NUMBER (leg 0:0-x sec, leg 1:x-20), and the like. The list may contain more information regarding the found words. Once the "real locations" list is created, the word spotting function is executed. Each word supposedly detected by the word spotting function is compared to the "real location" list. If an instance of the word exists in the relevant x-second leg then a hit is indicated. If the word does not exists in the relevant x-second leg then a False Alarm (FA) is indicated. The HIT/FALSE ALARM statistics are essentially the output of the word spotting function. The output is stored into a designated database in the following format: DOCUMENT ID, such as file identification, VERSION ID, such as a software type and software version number, WORD LIST, such as a vocabulary looked for, NUMBER OF HITS, such as the number of detections, FALSE ALARMS, such as the number of false alarms, OUT OF, such as the total number of words looked for. The designated database enables the analyzing of the results using a method that is similar to the manual one currently used. Consequent to the introduction of the results to the database querying and mining of the results is possible in a variety of ways. The call flow function 119 analyzes the dynamics of the call. The function 119 attempts to provide an indication of the call-flow parameters of the call. The calculated parameters include the percentages of the call's length, complete silence; talk over, agent speaking and customer speaking. The function 119 counts also the number of times the agents interrupts the speech of the customer and vice versa. It also gives details about the silence, talk over, and activity sections during the call. The function 119 is fed with a variety of streams where each stream represents a specific participant of the call. The function 119 is based on calculating energy levels within the digital speech of each participant of the call. Each of the analyzed interactions can be analyzed independently or in association with another type of interaction captured at the same time. Such can be a video interaction, a chat interaction, a screen event captured from the screen of the agent and the like. Similarly, associations between various interactions may be analyzed as well. So for example, audio and video interactions or audio and CRM data associated with the same call may be analyzed to identify various predetermined combinations of events or elements relating to the handling of the call or query (or offer for goods or services), the response by the agent, the appropriate response to a client or entry of data into the CRM at any given time during a call or an interaction between the business and the customer. The person skilled in the art will appreciate the various types of interactions, which may be associated together and analyzed to obtain like result and enhance the ability to analyze and respond to various events.

Figure 9:
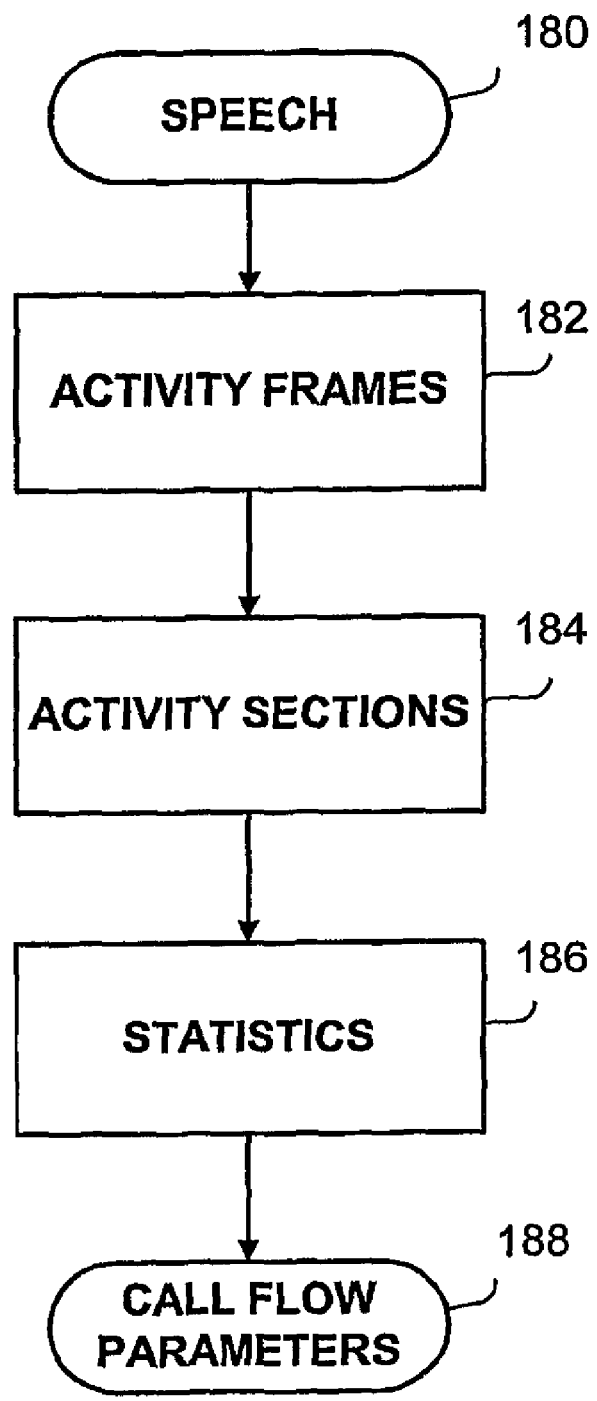
FIG. 9 is a flowchart of the call flow function, in accordance with a preferred embodiment of the present invention.

Referring now to FIG. 9 describing the operational steps of the call flow function which shows yet another example of the analysis of speech in accordance with the present invention. At step 180 a digital speech segment is introduced into the function. At step 182 the digital speech segment is sliced into frames of a few milliseconds. The energy of each frame is calculated and then compared to an adaptive threshold representing the maximum noise level. Frames with higher energy than the adaptive threshold are marked with an "activity on" flags while frames with energy lower than the threshold are marked with an "activity off" flag. Each participant of the call is represented as a vector of activity frames. At step 184 each participant-specific vector is passed through a filter. The filter yields a vector of "activity sections" where each section is constructed of consecutive or semi-consecutive frames marked with "activity on" flag. At step 186 the sections are processed such that statistics are generated concerning each participant activity and the mutual activities are calculated.

Referring back to FIG. 4 the call flow and emotion function 119 is responsible for providing an indication of the emotional state of a customer and/or an agent during a call. The output of the function 119 is the emotional state and intensity of each section of the call or any other interaction as well as the emotional state and intensity that represent the call in its entirety. The system can be used for real time emotional monitoring and it can also be used for collecting off-line statistics on the emotional states during interactions. The system can be programmed to analyze specific parts of the call based upon information from other applications, such as CTI. The system output is cross-referenced with other system outputs in order to improve the accuracy of the system or in order to yield higher order conclusions. Additional, types of system output or interactions may be associated with analyzed speech components to enhance the accuracy of the system and to better identify the speech segments to analyze or the operations and reactions of the contact center agent. Persons skilled in the art will appreciate that the frequently used expression "call" in the text of this document generally refers to the entire set of interaction types supported by the system including any sessions made between an agent and a customer or a client.

Figure 8:
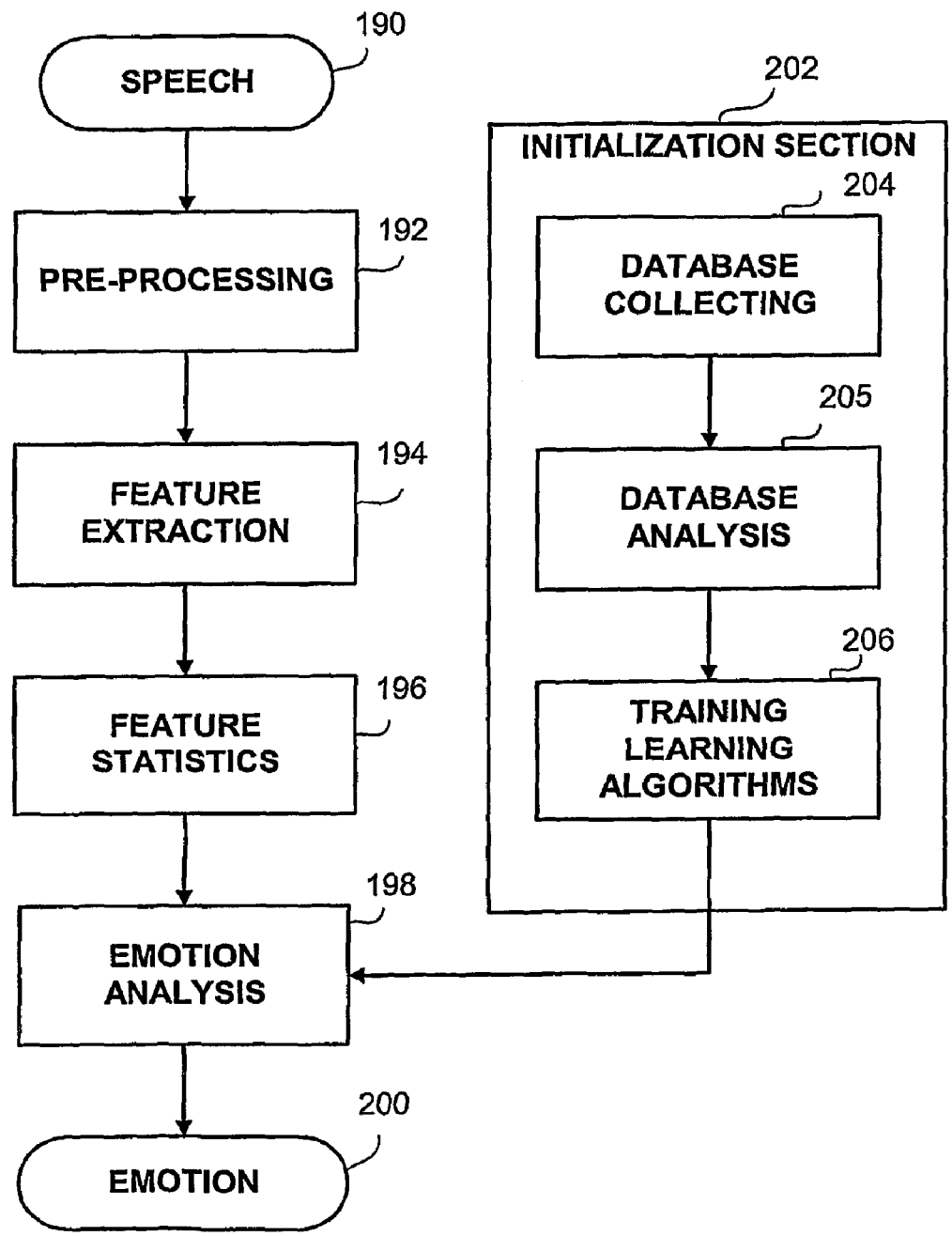
FIG. 8 is a flowchart of the emotion detection and monitoring function, in accordance with a preferred embodiment of the present invention.

Referring now to FIG. 8 that shows the operational steps involved in the execution of the emotion detection and monitoring function. The initialization section 202 is designed to run for the proper initialization for the system. Thus, the steps 204, 205, 206 have to be performed prior to the routine running of the system. The initialization section 202 could be executed either by the system vendor prior to installation at the user's site or consequent to the installation on the user site. The section 202 includes specific adaptation routines and is fed with parameters in accordance with user profile and the site profile. Consequent of the performance of the initialization steps 204, 205, 206 the system is ready to perform the emotion analysis on any number of calls without the necessity of repeating the initialization procedure unless the site-specific parameters must be modified. The steps 190 across 200 are performed for each operative call. Still referring to FIG. 8 at step 204 a database containing a plurality of recorded past interactions is addressed and at step 205 each recorded session is analyzed for the emotional state of the caller. At step 206 each recorded session extracted from the database and its associated emotional analysis from step 205 are fed into a learning function, such as a neural network, The learning function adjusts itself to yield in its output the matching emotional analysis. The result of step 206 is an adjusted classification system that will be used for the emotion decision in step 198. In the main execution sequence at step 190 a recorded speech segment is fed to the function as input data. At step 192 several pre-processing functions that are required prior to the performance of the excitement analysis are loaded and executed. These pre-processing functions include speaker separation and noise reduction. At step 194 useful speech data is extracted from the recorded speech segment and silent or noisy sections of the segment are discarded. Then the speech is divided into sub-segments each having a length of a few milliseconds. For each sub-segment a vector of voice features, such as pitch and energy are calculated. At step 196 the plurality of sub-segments fed from step 194 are collected into sections that represent a few seconds of speech. A vector of features characterizes each section where the sections represent statistics on the constituent voice features. Step 196 further includes an automatic learning mechanism concerning the characteristic voice features of a specific speaker being analyzed. When a speaker is known to the system the reference voice characteristics thereof are learned "on-the-fly" during a real time session. In contrast, when a speaker is known to the system in advance of an initiated call the reference voice characteristics of the unknown speaker are extracted from the database with the activation of the call. The database is updated after each call in accordance with results of the learning process. Thus, the system is adaptively learning from past experience as the history of the emotional pattern of a particular previously unknown party is suitably stored and the profile of the party is constantly being updated. At step 198 the function analyzes the statistics of the voice features of each section using the classification function yielded by step 206. The output 200 of step 198 is the emotional state and the intensity of each section of the call as well as the emotional state and the intensity representing the call in its entirety.

Referring back now to FIG. 4, the rule engine 112 holds logical deduction rules that assist the analysis processes in order to achieve intelligent conclusions. These rules could be introduced by the end-users of the system during the on-site configuration of the system or by the system vendor during the preparation of a system for installation in a designated environment. For example, rules for contact centers based on QM environment applications are different from rules pre-defined for operation in specific trading floors. The supervisors or management may manually change the rules. The system is adaptive and in response to results of analysis predetermined rules, sensitive to such results can change automatically. The rule engine 112 constantly examines the system information against its stored rules and when a rule's condition is met the rule engine 112 performs actions associated with the rule. The rule engine 112 provides the users of the system an associated tool to define rules and to identify specific behavioral patterns of agents and customers engaged in diverse types of interaction based on the interactions information captured. The rules can be adaptive and may change in accordance according to the results of the analysis. For example, a rule could search for an interaction that started with a call and was followed by a collaborative Web session. Such rule, when met, suggests that the agent who received the call successfully followed the call with assistance to the client through the collaborative web session. In another non-limiting example, a rule is met when two conditions are met: that a product name is mentioned by the customer and that the agent searched in the organization's knowledge base information about the same specific product as seen through the screen events captured.

Next, several exemplary rules associated with the rules engine 112 will be described. It would be easily understood by one with ordinary skills in the art that these examples are not meant to be limiting as diverse other rules with associated required actions and indications could be contemplated or could be implemented when practicing the present invention. The exemplary rule could include: a) the user of the system may wish to define an "angry" conversation by defining "angry" such that the conversation should contain certain words, a relatively high percent of talk over (when two or more persons talk at the same time on the same line) and/or negative excitement detection, b). the user of the system detects an unprofessional behavior of an agent by the detection of negative excitement on the agent side followed by a negative excitement on the customer side. The detection of the negative excitement patterns suggests that the agent was angry during the call and as a result the customer became aggravated. The indication data can further be cross linked to CRM information indicating unhappiness of the customer concerning the service, c) a user desires to identify patterns behavioral misconduct of speech manner by either a customer or an agent in order to better understand the reasons for "bad interaction" and furthermore to update the profiles of the agent and the customer accordingly, such as updating the CRM inherent customer profile categorized as a "hostile" customer such as an I-rate customer, d) a user wishes to handle a VIP customer in a careful, sensitive manner. For example, a VIP customer suffering from speech deficiency could be identified as such by the system following detection of certain speech deficiencies (stuttering, word repetitions, syllable repetitions). Consequently the user may chose to demonstrate high customer sensitivity by updating data in the organization's databases, such as the CRM database, leading to assigning a "sensitive" well qualified agent to handle such speech disabled VIP by selectively skill routing the call, e) a user detects impolite agent behavior by the identification of specific events during a call session, such as the agent interrupting the customer, agent is non-responsive to the needs of the customer, agent responds to the repeated requests of a customer by repeating the same sequence of words in his answer. The above agent behavioral pattern shows that the agent is not aware of the customer's difficulties in clarifying his/her requests, f) a combination of at least two rules such as shown above could be chosen to be a new rule. Thus, only when the two selected rules are met the combination rule is also met and a proper indication is provided, g) the use of specific words combined with screen events and/or CRM entries made at the time of use of the words. This rule will require the examination of CTI information as well as screen events captured and the voice interaction analyzed to find the word or words selected. In addition, and at the same time the organization's knowledge base may be queried to identify additional information required to perform the rule.

The person skilled in the art will appreciate that the rules provide enhanced simplicity for the introduction of any additional desired rules and the "calibration" of the rules during the operation of the system would be evident. The user is further provided with the liberty and flexibility to decide and to select the phenomena to look for and the manner for looking. One or more rules embodying one or more interactions and one or more associations may be easily captured, analyzed and an according response or event generated. By providing access to all types of extracted information, CRM data, the definition of time and event sequences and the combination of the above, a diversity of scenarios is operative in enhancing detection of specific characteristics, such as for example a search for impolite words followed by a high tone in the conversation or a particular screen event or a particular CRM entry or operation. The results of the rule analysis are easily implemented in the classification component thus enabling faster and more efficient future analysis.

Using the rule engine a plurality of phenomena included in but not-limited to a session can be sensed, recognized, identified, organized and optionally handled: a) multiple occurrences of events in a certain time frame, b) sequenced or concurrent occurrences of events, c) logical relations between events, the timing of the events and the extracted information, such as when an agent did not open a suitable application screen for at least 10 seconds after the customer asked to purchase shares in over $10,000, or where an agent was offered $10,000 worth of options if he can secure a particular limit on a particular share, d) customer-agent interaction analysis based on a combination of different sources, such as spotted words, simultaneous talking, silence periods, excitement type, excitement level, screen events, CTI information and the like.

The recognized phenomena could include the following non-limiting exemplary conclusions: a) total number of bursts in conversation, b) negative excitement in at least one side of the conversation, c) large percentage of talk over during the conversation, d) the average percent of the agent's talking time, e) the number of bursts the agent made into the customer's speech, f) the negative agent excitement prior to or consequent to customer excitement, g) agent tends to make a relatively high percentage of customers angry, h) long or frequent hold periods or long and frequent silence periods, which imply that the interaction of the agent with the system is inefficient, I) recurrent repetitions of the same answer by the agent. Additional recognized phenomena may include the association of each of the above phenomena with interactions or data or information extracted from CTI or other sources such as CRM or other interactions. Such phenomena may further be analyzed in connection with various other events such as screen events and CRM records, entries and free text. The actions generated by the rule engine may preferably drive high-level real-time status reports to the applications that will facilitate real-time alerts and real-time responses while simultaneously enhancing the information storage with the results. For example, long or frequent hold periods or long and frequent silence periods with out screen events or CRM activity may indicate a particular agent is ineffective. In another non-limiting example, the average percent of the agent's talking time is more then a predetermined threshold and various CRM entries are left empty may suggest the agent at the contact center has not been attentive or failed to properly conduct the call or interaction with a customer. In another example, a compliance officer or chief trader observes in real time the performance of the trader and receives notifications as to various content analysis results, such as that the agent has greeted the client properly or that the agent has used the word "bet" in the conversation while making a substantial transaction with another business. The supervisor may immediately call up the relevant session (whether it is a call or a chat session or e-mail or otherwise) and view at the same time the agent's screen captures. Other indications which may be available to the supervisor are whether the agent followed a specific procedure, whether the tone of the conversation is within acceptable parameters, items of need of investigation, call evaluation, use of client's name or other pleasantries, surveys performed, abusive behavior indication and the like.

Analysis processing may require intensive processing and can be implemented in any of the following fashions: a) as software processes running in an operating system environment of dedicated standard servers using the entire server data processing resources for the software. The processes could be run on one or more computing devices in the organization, such as for example the call center agent computing devices. Suitable load distributing utilities could be implemented to the handling of the large loads. As DSP processing boards with firmware, such as an array of DSP boards running the analysis function. The board could be used inside a voice-recording server, such as the NiceLog Voice Logger by Nice Systems of Raanana, Israel. The board could be further used in dedicated servers where each server integrates a plurality of such boards, or installed on a plurality of COMPUTING DEVICEs in the organization, such as every agent's COMPUTING DEVICE, localizing and distributing the processing load with little or no effect on the COMPUTING DEVICEs performance, c) for performance enhancement some of the processing that can be done in real time might be performed prior to the recording in such a manner as not to be affected by degradation of the voice signal associated with the recording process, d) the control and data infrastructure for this entire process can be implemented as software on one single standard server platform.

The content analysis process as proposed by the invention possesses several additional respects: a) Configurable Processing Power—During the system setup or during a call session an authorized user using a dedicated Man-Machine Interface (MMI) can intelligently control and manage the CPU resource allocation in accordance with the priorities and the performances. Thus, for example, a user could allocate about 30% of the CPU resources for word spotting, about 15% for excitement extraction/emotion detection and about 10% for speaker identification and verification. b) Utilization of Users Workstation Processing Power—When only insufficient processing power is available (due, for example, to server bottle-necks, malfunctions, insufficient bandwidth or the like) the agent's workstations are being used in order to enhance the processing power capacities, exploiting the agent's workstations particularly during periods when the machines are in logged off state. c) Customized Adaptive Database: c1) Vertical Market (e.g. vocabulary in trading floors)—The characteristics of a particular environment in terms of inherent vocabulary is identified and stored in the system database to be used on the analysis stage. For example, the word "shares" is used frequently in Trading Floors therefore it will be stored in a Trading Floor vocabulary. Various models can be created to keep track of the adaptive databases based on previous analysis so as to continuously update the databases and the rules of the system. c2) Acoustic Environment Modeling—The particular acoustic surrounding of a business environment is identified and stored in a database to be used by the audio classification module of the pre-processing stage. Different business environments are dominated by different acoustic elements. For example, the acoustic environment characteristics of a Trading Floor could include loud cross talk, commotion, slamming down of telephone receivers, and the like, in contrast with Call Centers where the ambient acoustics is quieter but other types of noise sounds dominate, such as keyboard clicks. c3) Multi-Media Adaptive CA Resource Allocation—The system's content analysis resources could be manually adapted in accordance with the preferences of a customer and/or in accordance with the environmental characteristics. A user manipulating a dedicated MMI could individually allocate CA resources to each multi-media type interaction. For example, about 5% of the analysis processing power could be assigned could be allocated to e-mail, about 5% to chat channels, about 40% to audio information and about 50% for video data. In the same manner about 50% of the processing power could be allocated to word spotting regarding e-mail, about 40% for emotion detection regarding video information, and the like. d) Controlled Real-Time and Off-Line Processing—The real-time processing of signals is performed via firmware utilizing powerful DSP arrays as this type of processing requires adequate processing power. In contrast, off-line processing requires mainly substantially large amount of memory and therefore could be performed by utilizing a plurality of computing devices substantially simultaneously. e) Coupling with other system platform inherent capabilities, such as retention, migration, and the like—The capability of retaining information on the platform is useful in avoiding situations where a word is spotted in real-time and when off-line evaluation starts the call session is no longer exists as it was automatically deleted by a inherent logger mechanism. Retention is also a valuable option in association with the migration feature. Under certain circumstances it is important to keep a call in the on-line storage device for quick access even when a call is migrated to an off-line storage device. f) Time Adaptive Resource Allocation—Most of the time there is a backlog of calls within specific data structure queues pending for the performance of analysis, such as for word spotting. The backlog is generated due to a substantially large amount of calls selected for content analysis processing and the inherent constraints of the user site, such as the amount of processing power available, and dynamically changing bandwidth limitations. The decision required from the system regarding "which call to analyze next?" is not a trivial task as there is a plurality of calls to choose from. The required solution has to serve the user's requirements in an optimal manner. The solution (preferable but not limiting) proposed is designed to operate as follows: Off-peak periods are typically non-random and usually fixed in time and known in advance as they typically occur at night, on weekends and on holidays. During the off-peak periods the most-recent-call method, such as FIFO, should not be used as typically it will distort the number of calls processed and will favor later day calls on earlier calls. Similarly on weekend it will create a plurality of analyzed calls towards the last-days-of-the week while discriminating the start-of-the-week days. Thus the proposed solution is to use different techniques under the following circumstances: a) When there is no backlog the system should always handle each required call or interaction within about 5 minutes after the call was completed or even sooner. At off-peak periods the system is idle. b1) When the backlog is small in such a manner that the analysis process could be typically closed completely within a short period of time (up to about 24 hours) when utilizing only the off-peaks hours during the night, the system should take high-priority calls, going from the most recent back and only following the completion of all high-priority calls should the low-priority calls handled. At night the system should select randomly dispersed high-priority calls from the day and then select the lower-priority calls in descending order. At weekends the system is idle, b2) When the backlog is medium in such a manner that the analysis process could be typically closed with a period of about 1 week (using week-end off-hours) the system should perform in similar manner as the small backlog conditions with calls remaining each day and then at the week-end the system should select (within each priority class) randomly-dispersed across the entire previous week. If a day's calls or a week's call are completely processed then the system should proceed to the previous day or previous week respectively, b3) When the backlog is large and/or growing and can not be closed (the system can not "clean" the queue) the system should finish the calls of the current day and should continue to process backward in time. Activity and manner of operations on nights, on weekends and on holidays should be preferably automatically determined in accordance with the call volume and the point in time. However, alternatively a system administrator could define the activity dynamically in accordance with the site's profile and its typical business activity. Backlog can be further handled by choosing in advance to analyze only the "interesting" portions of a call, in a predetermined manner according to the non-limiting important criteria, such as the different vertical market characteristics, user preferences and the like. Note should be taken that the above described manner of operations, timetables, activities and call handlings may be changed and that like techniques may be used as well in the context of the present invention. The underlying backlog-handling-related concept of the invention is the adoption/selection of appropriate functions for the analyzing process according and with respect to the requirements, preferences and needs of the user. g) Surveillance/Security Related Benefits—The system and method proposed by the present invention provide a capability that contributes both to the actual performance of the analysis functions and simultaneously could be used for security-related purpose, such as the identification of suspicious signs. For example the capability of detecting a foreign accent or a specific language dialect will contribute to the operators and users of in at least two useful benefits, g1) The technology of voice recognition today relies on examining how people pronounce phonemes. Pronunciation varies with accents and dialects. The closer the found pronunciation matches the expected one, the better the detection accuracy. Currently, different packages are provided per language variants, allowing focusing on one type of dialect and this increasing accuracy. Therefore, when an accent or a dialect is known in advance, the voice recognition function can use the phonetic distinction of this accent or dialect to increase the efficiency of the performance. The inherent functions are enhanced due to pre-known automatically detected accent, 2g) Once an accent is detected in real-time security key personnel can be notified and the profile of the subject is updated. For example, after the events of September 11 any video or audio detection that can enhance the real-time detection of suspicious signs is welcomed by the security forces. One of the input sources of the content analysis system of the present invention is video. Examples of the capabilities, usages and applications that a video content analysis system can provide are presented co-pending U.S. patent application Ser. No. 60/259,158 titled CONTENT-BASED ANALYSIS AND STORAGE MANAGEMENT, filed 3 Jan. 2001, and to co-pending U.S. provisional patent application Ser. No. 60/354,209 titled ALARM SYSTEM BASED ON VIDEO ANALYSIS, filed 6 Feb. 2002 and U.S. patent application Ser. No. 10/056,049 titled VIDEO AND AUDIO CONTENT ANALYSIS filed 30 Jan. 2002.

h) Automatic Classification into Customer segments—This option is used to improve the handling, the up-selling and the cross-selling. The technique uses a speech detection function to identify gender, age, and area of residence, demographical background, and the like. Such classification information will substantially assist an agent during a call session vis-a-vis a potential customer. For example, subsequent to the identification of the gender of the customer as a woman products suitable only for women will be offered. Selective information stored in external databases such as a CRM database is being used both in real-time and off-line to collect a priori information on the customers, i) Audio Splitting and Summing—To reduce the overhead of the system and the implied cost of ownership in terms of storage a non-limiting technique is proposed. The solution involves audio streams that are recorded un-summed, such as being split into two speaking sides, are consequently summed and compressed after processed and prior to being moved to long term storage. The solution affects a considerable reduction of storage space and network load. Typically, the storage space taken by split recording is about 50% more then that of a summed recording. Compression methods currently achieve about 12-fold reduction in the volume of information. When combined the two methods can achieve about 18-fold saving, j) Agent Auto-Coaching—Using real-time content analysis combined with a set of rules that take into account specific content elements of all types, organizations could define criteria that evaluate agent performance and customer behavior "on-the-fly". The conclusions could be presented to the agents during or after the performance of the call. The application will use the rule to continuously look for specific keywords, emotion levels, talk behavior and other content. When a pre-defined combination is found it will pop-up a matching coaching statement on the agent computing device screen. When working after the call the application will display a list of tips and statements as a summary for the agent to study the list and act on it for later improvement. k) Extraction of predetermined parts of the Interaction—The system of the present invention is also configurable to save computer power and computing resources by pre processing and/or analyzing certain predetermined parts of an interaction. For example, the pre processing and capture device shall only extract the portion of agent A to talking to customer B rather than extracting the full conversation.

Figure 5:
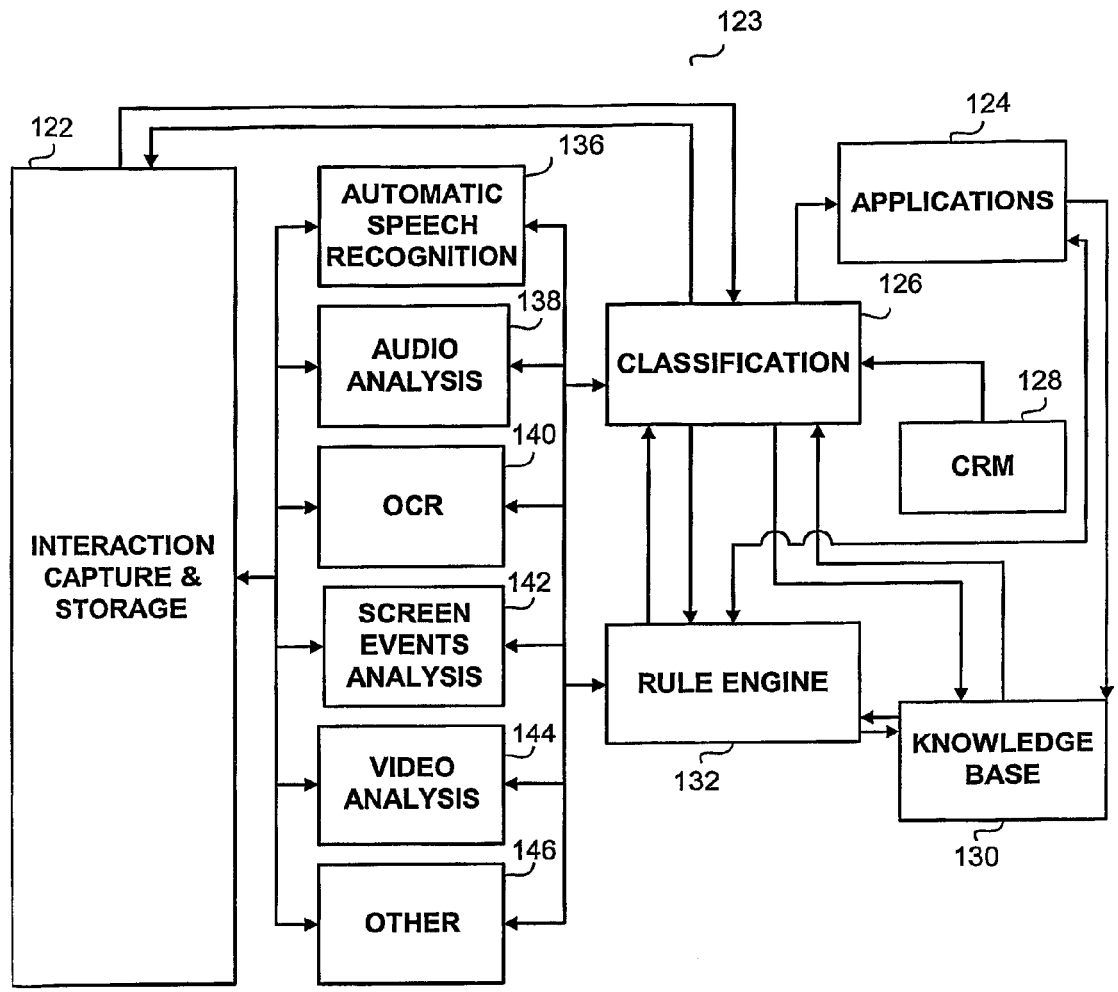
FIGS. 5 and 6 show alternative examples of the content analysis process, in accordance with the preferred embodiment of the present invention.
Figure 6:
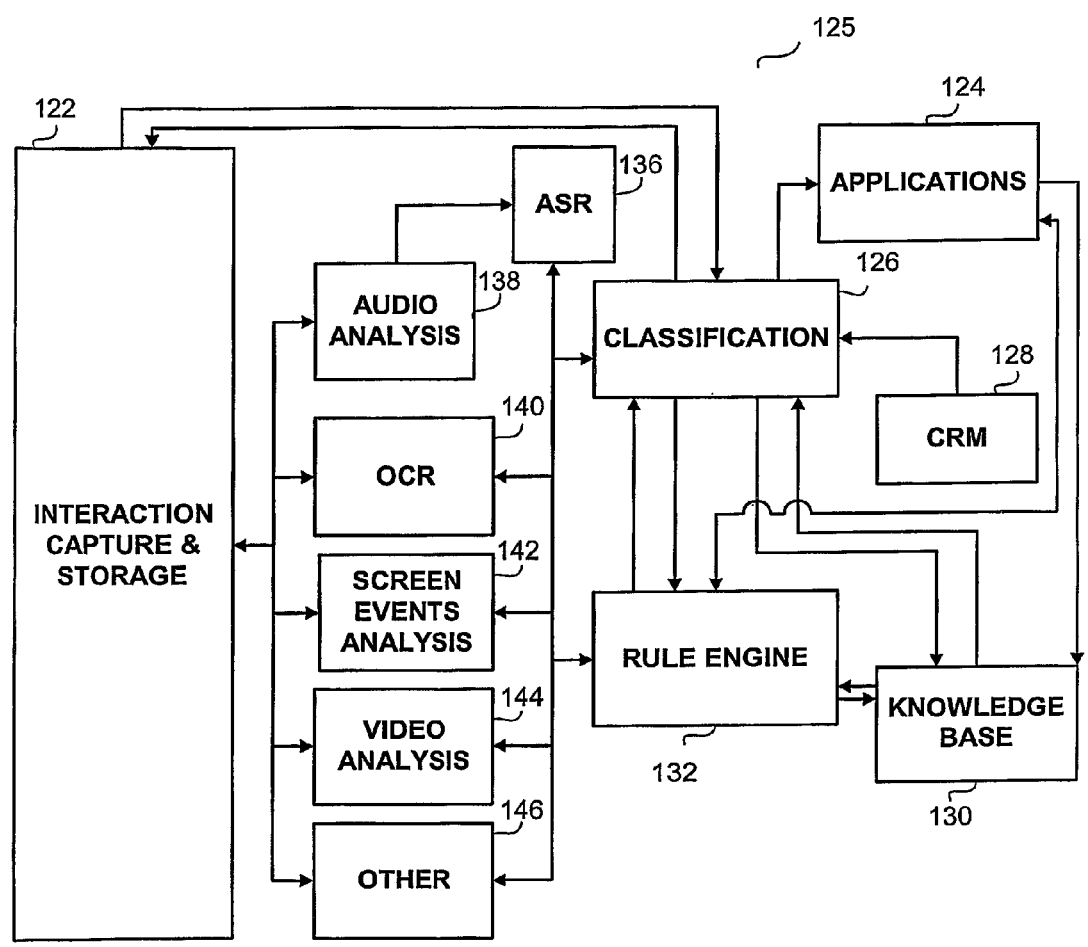

FIGS. 5 and 6 show alternative examples of the content analysis processes where each type of interaction media content is analyzed respectively in a suitable manner. The content analysis functions 123, 125 could be either activated in parallel as demonstrated in FIG. 5 or sequentially as demonstrated in FIG. 6 where the Audio analysis 138 is performed prior to the Automatic Speech Recognition (ASR) function 136 Next, some exemplary processing options will be described: a) Voice from microphones, calls and voice messages is passed through an Automatic Speech Recognition (ASR) function 136. The input to the ASR function 136 undergoes an intense pre-processing stage that includes a primary audio classification process operative in classifying speech into speech segments/clusters, a noise reduction process, and an identification process operative in assigning each piece of voice to a specific speaking party. Note should be taken that speaker identification yields a more accurate speaker-dependent ASR process. The resulting recognized text includes at least two attributes for each word or phrase separately: the precise point of time within the interaction and the accuracy of recognition probability or certainty of recognition, b) The Audio Analysis function 138 is operative in the identification, detection and analysis of call flaw, speech emotion pattern recognition, word spotting and speaker separation and identification. The audio analysis 138 can be done either as part of the analysis state 34 of FIG. 4 or as shown in FIGS. 5 and 6 as part of the pre-processing stage, c) Video, Videophone and Video Teleconferencing information is processed by the video analysis module 144. The module 144 includes various video information processing functions, such as face recognition, behavior recognition and the like. A more detailed description of the video analysis is provided in the co-pending patent application entitled "VIDEO AND AUDIO CONTENT ANALYSIS SYSTEM" incorporated herein by reference, d) Optical Character Recognition (OCR) 140 is a known off-the-shelf software application product. The OCR 140 is a text scanning application operative in the conversion of a set of characters printed on a document, such as paper mail, facsimile pages and the like, into digital codes and the storing of the resulting codes into computer storage having a standard text format. The texts stored are further analyzed by the content analysis stage to produce suitable reports, e) Screen events are processed by the screen events analysis module 142 to collect business knowledge on the action of a user and information displayed on the screen during an interaction typically for the purposes of quality management but also for use in the analysis process as part of the interaction. The analysis process is supported on pre-programmed business-specific knowledge concerning the elements of interest in the agent applications. For example, in a trading floor environment the field name "number of shares sold" is pre-defined as a Region of Interest (ROI). When the agent enters a certain amount into the filed it becomes a candidate for analysis. f) The others 146 refer to diverse other multi-media interactions, such as e-mail, chat, collaborative web browsing, and the like. Any interaction types and associated media types may be supported by content analysis system with appropriate pre-processing and analysis tools added. The operations of ICS device 122, rule engine 132, classification device 126, the knowledge base 130 and the organizations' CRM application 128 as well as the results to be provided to the various applications 124 is described in association with FIG. 1-4 above.

Referring now back to FIG. 4 the content classification module 110 utilizes a data analysis procedure for classifying disparate date elements into coherent classes referred to as categories. The performing of the procedure in association with a set of user-defined categories with the categorization logic matches each interaction against the existing categories in order to find the most suitable category for the interaction. In addition, the procedure can also improve existing categorization over time by fine-tuning category criteria, by merging two or more categories into a single or by splitting a single category into two or more new categories. Furthermore, the procedure could cluster interactions into new categories where they do not fit well in any of the existing ones. The procedure could further provide descriptive information derived from the members of a category. A suitable database containing the categories and the appropriate associations can be created and used by the rule engine 112. The following examples describe specific data elements that are suitable candidates for classification, association and categorization: a) Voice features that result from the audio analysis process 114 and include tone and pitch of voice, speaker duration and silence detection periods, and stress and excitement analysis, b) CRM text notes that are free text comments attributed to a specific interaction written by a customer handling service representative in the CRM system 120, c) Discrete meta-data including several contributive sources: 1c) Interaction meta-data that includes CTI information 88 details relating to the specific interaction captured by the ICS component 94. Such details could include indications concerning a transferred call, a call on hold, a conference call and the like, 2c) CRM information 120 including, for example a customer identification number, a customer profile, customer qualifications and descriptions (e.g. club membership status, revenue generated, known service preferences, and the like), transaction information pertaining to a transaction made during the interaction (e.g. the product bought, the amount paid, the payment terms, and the like), word spotted and the history of the transactions, the data can be exported to the CRM application for further analysis in the CRM application, 3c) Agent profiles stored in the organization knowledge base 86 where an agent profile could include an agent identification, an agent experience indicator, training history, collected agent voice, and the like.

During the classification stage the system utilizes all relevant information such as meta-data and customer history files in order to improve the analysis of an individual interaction. Typically, the more attributes are provided for an interaction the better the resulting categorization.

Referring now back to FIG. 1 the applications unit 12, FIG. 2A applications 362, FIG. 2B applications 202 symbolizes a set of potential applications that could receive and use the output of the content analysis as input data. Next, the various exemplary applications that are fed by the output of the content analysis are going to be discussed in greater detail:

A) Analytical CRM applications: The entire set of original and processed information described above can be exported and used by Analytical CRM applications in conjunction with any other information in an enterprise data warehouse or in a smaller scale data-mart. These solutions use diverse data analysis functions for customer segmentation, customer behavior analysis, predictive module building, and the like. The information revealed in the above-discussed dimensions is directly related to customer information used in data warehouses. However, this information does not include the aspects of customer interaction content, which is a critical authentic element of the problem. For example, a telephone customer attrition predictive model is typically built against CRM databases and billing databases. But, the analysis of conversation topics may expose that the optimal predictor for customer attrition are requests for competitive rates. The visualization tools of the Analytical CRM tools could also display analyzed content; Content analysis output is applicable in the following major dimensions for analytical purposes:

1a) Propagated data that is data analyzed in bulk to create knowledge relating to the entire customer base, or extensive sub-groups of the same. The number of interactions matched to pre-defined categories and the new categories identified expose a large number of propensities. For example, showing the terms customers use to refer to a new campaign or a product advertised by the business or seeing patterns of certain customer behavior, such as the stages leading up to a customer discontinuing a relationship with the business.

2a) Customer specific data that is all data attributed to a specific customer. Such data is analyzed and related to the customer in order to expose knowledge specific to the customer behavior pattern, language and preferences.

3a) Segment specific data that is data analyzed and related to a specific category, such as a certain product, to produce information regarding the relation to the product in the content of interactions. For example, the distribution of emotional interactions and correlation with release of new products/versions could suggest that specific products are being marketed before being ready.

B) Customer Experience Management (CEM) applications: All the applications focused on the customer's experience and on the agent's quality of service will be particularly enhanced consequent to the utilization of the content analysis results. In addition, new applications are made possible:

1b) Enhanced Playback: Typically, the playback of calls is a time consuming and highly complex task. It takes just about the duration of the entire original recording to play it back and when complex segments of the recording are needed to be replayed, the duration of the playback process could be even longer than that of the original recording. For example, when a large trade transaction is made in a busy and noisy environment, such as a trade floor, via a call session having a significant amount of cross talk regarding a customer/agent dispute, in order to faithfully restore the details of the trade the recorded passages containing the vital details will need to be played back several times, while all other parts will also need to be played back to provide the suitable context. Thus, a considerable waste of time and resources will be affected. Although known playback mechanisms allow pause/resume playback functions, random access to a specific point in the recording, acceleration and deceleration control, skipping over silence, loop repeat, and even noise-reduction processing, none of the methods are particularly efficient when unclear, crucial details are scattered throughout the call. All existing tools are lacking the direct support for achieving optimal playback audio acoustic cleanness while decreasing the duration of the listening.

Referring back to FIG. 4, using the innovative solution presented by the invention, the playback application uses the output of the content analysis system, utilizing the results of both the pre-processing stage 82 and the analysis stage 84. These results were previously stored in the organization knowledge base 86 or in the ICS 94. The results of the audio classification functions 90, the analysis ASR 116, the audio analysis 114, the call flow and emotion 119 and speaker identification functions 118 are all obtained and further processed by the rule engine 112. The playback application is actually using the a priori obtained and processed information in the following manner: Base on the quality and clarity of the voice it speeds up or slows down playback automatically. Easily understood, clear, or unimportant parts are skipped while difficult parts are slowed down or even repeated. The playback uses additional information related to the recording session, such as CTI information 88 or screen captures or other interactions from the ICS device 94. The CTI information includes details such as when the call took place, the directionality of the call (incoming, outgoing), the phone number of the customer, the personal identification of the agent, and the like. The playback application works for example as follows: During playback every interval of the recoding is automatically accelerated or decelerated to a specific speed that provides comprehensible listening. The determining parameters are, for example, the accuracy certainty of the voice recognition. Low certainty intervals are played at lower speed with the lowest speed reached at the lowest certainty. Thus, when speech is unclear the playback slows down such that the listener can better understand what was being said. In contrast, in recording segments that include silence, clear speech or slow speech the playback speed is increased up to a specific maximum speed that still provides reasonable comprehension to a listener. The playback speed limits are pre-set by the users where the limiting values are restricted by the voice processing software or hardware. Thus, subsequent to the setting of the limiting values the listener is provided with the option of freely listening to an automatically controlled playback of a recording. The proposed playback solution is advantageous over existing techniques as it provides the capability of taking a full advantage of the information/results generated by the content analysis system in order to enhance performance in terms of the PB clarity and effectiveness. At the same time the quality of the recorded segments in proportion to the intelligibility thereof is substantially improved. If the user requires that the content analyzed will include an additional interaction associated with the call, the system will provide during the playback the presentation of the additional information. For example, if an e-mail arrived in association with the call and both agent and client are discussing or discussed that e-mail, the system displays for the supervisor that e-mail. At the same time, particular words filtered for in the e-mail may be highlighted.

2b) Scheduling of recording can be defined in association with specific conditions. The conditions could include diverse content classification entities such as the identification of excitement in the voice of the participants, the appearance of a word or a certain topic, the combination of more then one condition such as the appearance of a particular word in an interaction combined with a particular action by the agent, and the like. Thus, a recording could be initiated following the emergence of a severe debate in a call session or consequent to the mentioning of specific negotiation-related elements, such as commodity price, supply date, or when an agent has used words relating to presents and received an e-mail containing words affecting a promise in exchange for favors, and the like. Recording can also be started even after the call has began from a particular time frame after the call started or from the beginning of the call.

3b) The monitoring of the interaction performed in real-time is advantageous as it is substantially enhanced by the utilization of advanced content-based mechanisms described above. The content analysis system based upon the content of the interaction will perform specific real-time actions. For example, upon detecting specific pre-defined verbal expressions within the customer's speech stream, such as "I have a suggestion", "I have a complaint", or the like, the agent is alerted by the reception of a real-time notification. Thus, the system ensures that the agent will "stay alert" and maintain a set of suitable memory aids (notes, memos) for recording the customers comments, ideas, complaints, and requests. This feature will provide future follow up and the distribution of the customer's ideas to the appropriate organizational units. The real time monitoring may also examine more than one interaction at the same time. For example, the speech stream monitored may be associated with collaborative web sessions performed by the client and if the client errs on how to use the web application offered by the organization and the agent fails to notify or correct the client the content analysis system may alert the agent and/or a supervisor or a manager.

4b) Real time alert/notification, such as alerting an agent, a customer, compliance officers, supervisors, and the like is utilized for the purposes of fraud detection and other operational activities within an organization which require the taking of immediate action following specific indications detected via the analysis of the interaction data. These actions could be operative in the lowering of the operating costs of the business and the timely prevention of potential legal and liability issues.

5b) Improved querying capability and searching capability within multi-media databases of interactions relaying on content parameters as well as meta-data or extrinsic data will provide more accessible interaction-related information to additional functions and to persons within the organization.

6b) Reports: The reports are generated using a specifically designed and developed web based software product referred to as the Reporter. The scalabilities, multi-site and multi-database characteristics of the product substantially contribute to the straightforward manner and ease of adding content analysis based reports. Content analysis reports include statistics, direct comparison results, follow-ups and the like. All the reports are addressing appearances of certain content commonly used in regard to other interaction/transactional information. The following are non-limiting examples of groups of reports: Word Spotting and CTI reports where CTI information is used in order to retrieve an agent user ID, the call time, and the like, Emotion/Excitement, CTI and User Information reports, Word Spotting, CTI and QA Information reports, Agent-Customer Interaction Talk Analysis reports, and the like.

Figure 7:
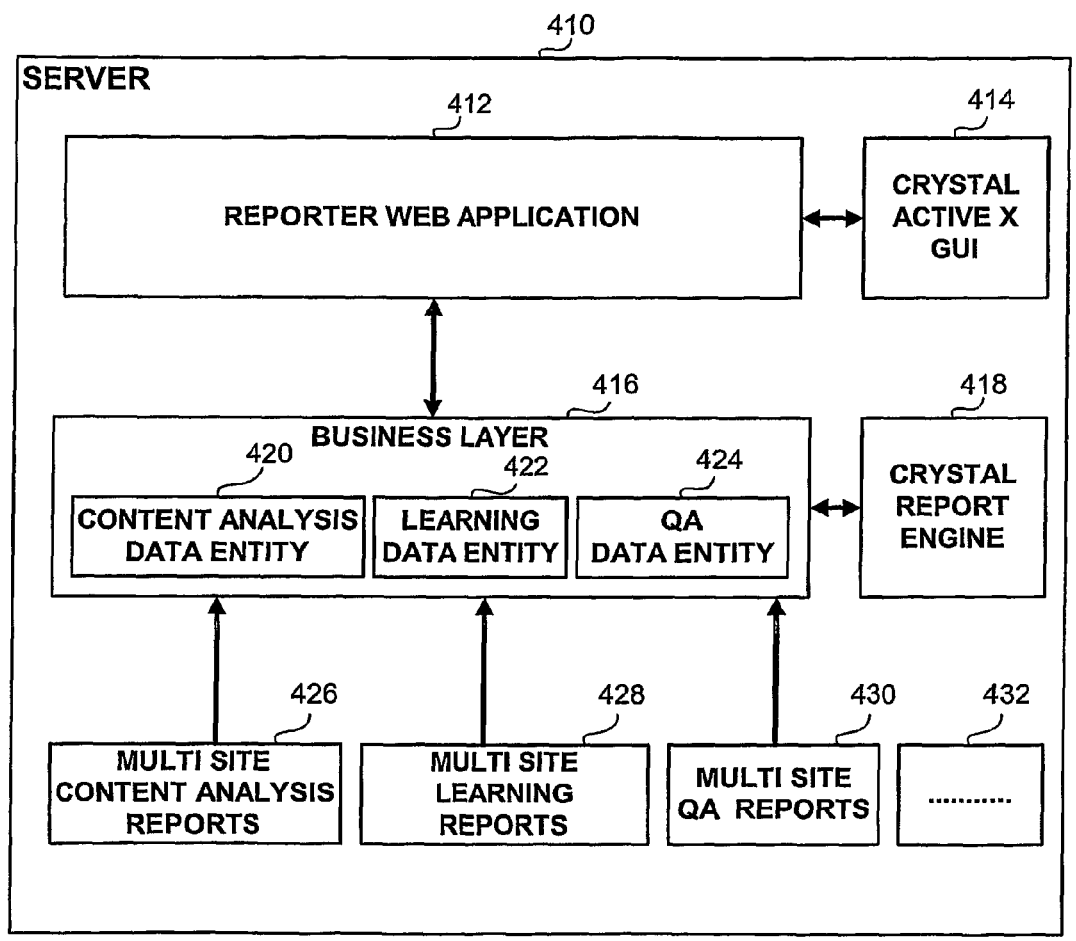
FIG. 7 is a schematic block diagram of the content analysis components of the exemplary Reporter device.

Referring now to FIG. 7, is a schematic block diagram of the content analysis components of the exemplary Reporter device 410. The core of the Reporter device is the business layer 416. The business layer 416 is built from multiple data entities. Each data entity includes the business logic for a set of report templates. Sets of such entities are the Content Analysis data entities 420, the Learning Data entities 422 and the QA Data entities 424. Using the report administrator a user can easily prepare new report templates, such as Multi-Site Content Analysis reports 426 that are based on the data entity capabilities, Multi Site Learning reports 428, Multi Site QA reports 430 and other reports 432 predetermined or later prepared by the user of the system. The data entity is responsible for preparing the requested search of information generating automatic SQL statements used by the Crystal Report Engine 418 by Crystal Decisions, Palo Alto, Calif. The data entity is also responsible for passing lists of parameters like user lists, word lists, group of word lists and the like that are related to the application defining the reports. The business layer 416 is build from several; components, such as the Report Object (not shown), Business Object (not shown), and the like, and could be used in World Wide Web (web) environments as well as in client applications. The Crystal Report server receives the report definitions from the business layer 416 and runs the report on the databases, such as the Content Analysis database, Evaluation (QM) database, CTI database, CRM database, Screen Events database, Customer Surveys database, e-learning database, and the like. The report result information is passed back to the business layer 416 then to the web server and the web application 412 and is viewed on the ActiveX Crystal Report client 414 (the user's workstation). The Reporter Web Application 412 is the Web GUI layer residing on the web server. Next an exemplary report based on the content analysis system will be described in more detail. A user desires to create a report to assist him in the process of identifying the reasons for the cancellation of subscriptions for a specific product. With the help of such a report the user will be able to selectively identify calls that are related to his products. The content analysis based report enables the user to analyze all the calls related to his products and the particular cancellation issue revealed in the same calls. After the activation of the report the system searches for specific calls in which the particular issue (cancellation) and particular products appear. If a particular product is the Satellite Internet Service, for example, then a group is created containing the words Satellite, Dish, "G eleven" (An exemplary satellite brand). Simultaneously an issue group containing the words abandon, cancellation, suspended, terminated or the like, is created. Note should be taken that although the report is not wholly accurate it still affects a considerable saving of time when searching and provides a substantially improved comparison between products.

7b) E-learning content based sessions: Based on specific evaluation results the system is triggered to send an e-learning tutorials to specific agents in order to improve their skills in the identification and description of the customer-supplied ideas provided during the interaction. For example, an e-learning session is sent to an agent in association with a sample of a recorded interaction, such as an AVI file, that includes a customer-supplied idea. The agent is required to identify the idea and fill up a pre-defined form in order to describe the idea.

8b) Customer Surveys Content Analysis: The surveys that reside in the organization database are analyzed using text extraction methods. Based on the results derived from the analysis specific actions are initiated. For example, a Call Center manager detects that a certain campaign group is not achieving the predicted profit. Consequently the manager utilizes the IVR post-call surveys to obtain customer reactions. Analyzing the content of the customer's surveys producing reports could provide the reasons for the lack of profits, such as product is unsatisfactory, lack of experience of the handling agents and the like.

9b) Automatic quality monitoring: Based on pre-defined criteria regarding an agent's use of conversational and negotiation guidelines, such as form of greetings, call termination, and operational skills and the like, the system will notify a supervising function in instances where the guidelines are not followed. In addition, appropriate evaluation forms will be created according to the results. For example, the content analysis engine could identify that the proper greeting is missing in a call. Thus, in the QM evaluation form the subsection scoring the agent's courtesy is automatically filled by the value "0". In another example, the content analysis system could identify that the agent did not ask a particular question and that the CRM application was not updated for the answer of that particular question. The use of more than one condition will enable the system to be more efficient targeting on the proper events for review.

10b) Data Visualization presents the information and knowledge created in the entire analysis process in a visual form, which is adjustable and controllable by the user. Visualization provides an intuitive and flexible display of various dimensions of the information. Beginning at a high-level view, the user could browse the information to examine areas of interest, to enlarge and sharpen the display resolution of one segment of a more general field of view, change the dimensions displayed (category popularity versus cohesion versus growth trend) and the like. Populations of interactions can be zoomed in on allowing the pinpointing of individual interactions by placement, and the color of similar visual attributes. Further zooming in could display segments of the interaction with diverse attributes of interest. The visualization tool can draw the analyst attention based on a set of pre-defined rules regarding specific subject matter.

11b) Content based knowledge management enables access to information that is part of the interaction stored in a scattered manner across the organization's knowledge database, CTI database, CRM database, Screen Event database, Administrator database and the like.

12b) Customer interaction analytics: Using the entire customer interaction database created as describe above, various data mining and analytical modeling techniques can be applied, enabling a deep research of the information, finding correlations, hidden patterns, trend and the like.

Figure 11:
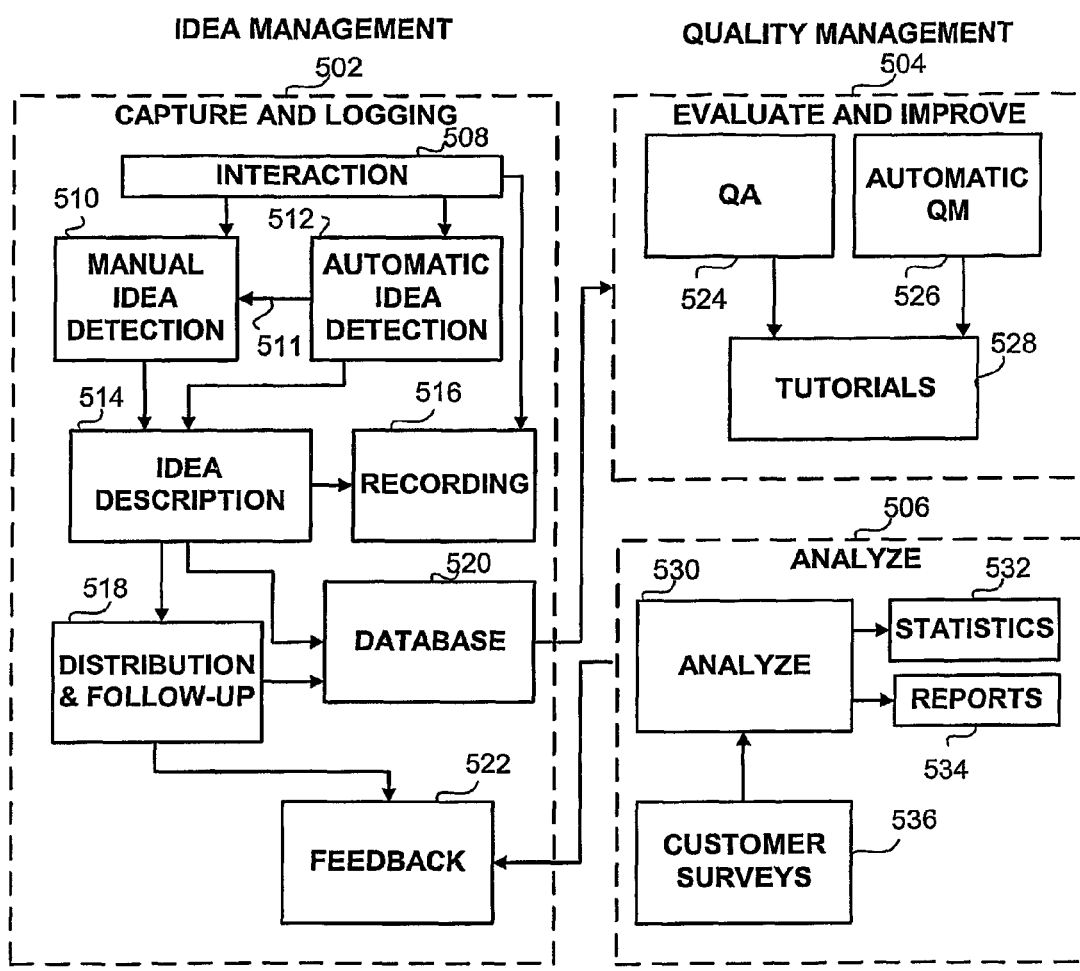
FIG. 11 is an example of the content analysis processes where each type of interaction media content is analyzed to detect new ideas within interactions in accordance with another preferred embodiment of the present invention.

Further examples of e-learning content based sessions generated following the recognition of specific content of an interaction and further description of the Automatic Quality Management form and further examples of real-time events generated following the recognition of specific content of an interaction can be seen in association with FIG. 11.

Referring now to FIG. 11 showing another alternative example of the content analysis processes where each type of interaction media content is analyzed to detect new ideas within interactions. In this alternative embodiment a device for "hunting" customer's idea (given during interaction) and using it for the benefit of the organization is shown in accordance with another preferred embodiment of the present invention. Idea in the context of the present invention is any data of any type exchanged during an interaction, including, but not limited to, suggestion, protest, proposed idea, communication which could be interpreted as suggesting a suggestion, a protest or providing an innovation or change of any sort, or an idea to be acted upon or which may benefit the organization if acted upon, and the like. The idea management device is preferably divided into three main parts: Idea Management device 502 for managing ideas, Idea base Quality Management (QM) device 504 for evaluating and improving management and optionally an analysis engine 506 for an analysis on the ideas received and processed for reporting and statistics. In addition, Idea Management device 502 is operative to capture an idea (through capturing interactions), logging the idea, analyzing the idea, distributing the idea (vertically and horizontally across the organization) and generating feedback. A preferred (but not limiting) embodiment of the present invention is best demonstrated using contact centers, which features frequent, and multi media types of interactions between agents and customers. Still referring to FIG. 11 the content of an interaction 508 between parties such as agent and a customer contain pieces of valuable information that are being exchanged (complains, tips to follow, requests and the like). One non-limiting example is an idea or suggestion for improvement. The interaction can be an e-mail, a voice call, a chat session, a CRM entry, a screen capture and the like. The idea is detected using one of the following methods (or preferably as a combination of the two): Manually identified by the agent. 510 (As an example agent enters in a designated place his/hers understanding of the idea); the idea is automatically detected by the Automatic Idea Detection module 512 (which can be through the use of devices described above such as word spotting, content extraction and other similar content analysis devices). Furthermore, combination of the two devices 510, 512 is best demonstrated when the system automatically detects during interaction a (pre-defined) sentence such as "I have a suggestion", "I would like to offer", I have an idea" alone or in combination with another interaction such as a CRM entry and the like. Identification of conditions that occur generates notification 511 to the agent as to make sure the idea will be captured and that the agent will feed the idea into the system. (Automatically supervising and certifying ideas wouldn't be lost). Notification can include pop up messages, vocal messages, SMS messages, text messages, e-mail, buzzer alarm, facsimile messages, video messages, and the like. As a result of the detection of the idea an Idea Description 514 is created, either manually or automatically. In the automatic idea detection module 512 the idea description can be for example the text entered by the agent in the relevant CRM field in response to the idea suggested by the client. The idea description with its associated interaction parameters (the actual recording of the interaction, added annotation and any other relevant information to support the follow up actions is maintained in storage database 520 tagged for further actions. Such further actions may include distribution, analysis, report, statistics, feedback, and the like. Recording of the Interaction by the recording device 516 can be triggered by an event generated when the agent enters the idea into a designated field. One example is the capturing of browser sessions which is described in co-pending U.S. Provisional No. 60/227,478 RECORDING & RETRIEVING WEB USER ACTIVITY filed on Aug. 24, 2000 and in co-pending PCT patent application titled SYSTEM AND METHOD FOR CAPTURING BROWSER SESSIONS AND USER ACTIONS filed 24 Aug. 200, which are incorporated herein by reference. The Recording device 516 for quality management and analysis purposes records the actual Interaction. The idea is distributed by the Distribution and Follow-Up module 518 vertically and horizontally preferably inside the organization, but also to other predetermined persons. The idea is directed inside the organization to the appropriate key personal for evaluation. For example, the idea may be directed either to a specific department or to several departments based on the scope of the content. The moment an idea starts to propagate around the organization it can be followed and in any stage feedbacks can be generated to all parties that were previously involved (interact) with the idea. The feedbacks are generated and managed by the Feedback module 522. For example, an agent may be notified by e-mail that the idea was rejected, or a customer may be informed on a successful implementation of her idea. Note should be taken that during any stage in the lifetime cycle of the idea, any handler can add a follow-up information, such as comments as meta-data. Furthermore, all including any events exerted around the idea are recorded in the database 520 for follow up and further processing. Other organizational databases such as the knowledge base database (not shown) can be similarly updated with the idea or idea related information or meta-data. Idea evaluation can yield a rejection or recommendation for further action. In the case of the later the idea can further propagate through the use of the Distribution and Follow up module 518 throughout the organization preferably until it reaches designated decision makers that effectively use and implement the proposed idea.

Still referring to FIG. 11 from the information gathered in the database relating to various ideas and the manner of handling such ideas within the organization managers or supervisors can further mine the data. In addition, an analysis module 530 can provide statistics 532 and generate reports 534. For example, the analysis module 530 may retrieve from the database 520 how many ideas caused an action that eventually contributed to the organization profit or how many ideas are still in process or are neglected or are accepted or are implemented or are rejected per topic or the length of time from idea initiation to completion, and the like. The analysis module may further update the Feedback module 522 with the analysis results to be shared with the generators of the ideas, (and with all or some parties involved in the ideas propagation chain) sharing the success and benefits gained by implementing the idea. This serves as to encourage and motivate the organization members that were engaged in handling the idea. In particular to make the idea generator (either the customer or someone inside the organization) feel that he or she was key participant in the evolution (and some time revolution) created. Organization are recommended as conduct to exercise some way of rewarding the parties involved especially in the case were customer idea is involved. The organization can use customer surveys generated by the customer survey device 536 in order to feed the organization's analysis process. The surveys contain customer's comments or opinions regarding the idea implemented. The organization managers can then measure the full impact in term of customer's satisfaction and further assess the success of managing the idea. During any process of quality management, the interaction and transactional data are accessible through the database 520. The quality management device 504 evaluates the skills of the agent in identifying and understanding of the idea provided during an interaction. The quality management process may be accomplished manually when supervisors making evaluations using evaluation forms that contain questions regarding ideas identification with their respective weight enter such evaluations to the QM module 524. For example, supervisor may playback the interaction, checking that the idea description provided by an agent comports the actual idea provided by the customer. Score can be Yes, No, N/A or weighted combo box (grades 1 to 10). The Automatic QM module 526 can also perform quality management automatically. The Automatic QM module comprises pre-defined rule and action engines that fill the idea section of the evaluation forms automatically (without human intervention). Using screens events capturing, any information entered into the idea description fields generates event. Thus, the moment an idea is entered, the agent receives a scoring automatically. Furthermore, using also the content analysis process described herein key words like suggestion, idea, tip, and the like may be identified and aid in automatically deducing that content of the idea description. Based on the evaluation results the system may send tutorials 528 to agents in order to improve their skills in identifying and describing ideas given to them during the interaction. Example of such tutorial is an eLearning session comprised of samples of recorded interaction that contains ideas. The agent needs to identify the idea and fill up an associated description. Like sessions may be automatically provided to an agent upon the agent receiving low score at an evaluation or failing to locate an idea. The Automatic Idea detection is accomplished by employing the Automatic Idea Detection module 512 which is operative in like manner to analysis and interpretation stage 84 of FIG. 4 or Rule based analysis engine 300 and apparatus 100 of FIG. 2A (also shown as rule based analysis engine 218 of FIG. 2B). The engine 512 may use for example pre-defined lists of words and sentences (lists preferably configured on site per business) to be identified. It may at the same time compare the entry of such words, like "idea", "innovation" "new" with a screen capture where the agent has filled the IDEA field and in addition at the same time find that the CRM field IDEA has been updated. Moreover, the message 511 were the agent receives automatic notification if he fails to identify that customer introduced an idea during the interaction is designed to assure that an idea is not missed.

The person skilled in the art will appreciate that what has been shown is not limited to the description above. The person skilled in the art will appreciate that examples shown here above are in no way limiting and serve to better and adequately describe the present invention. Those skilled in the art to which this invention pertains will appreciate the many modifications and other embodiments of the invention. It will be apparent that the present invention is not limited to the specific embodiments disclosed and those modifications and other embodiments are intended to be included within the scope of the invention. Although specific terms are employed herein, they are used in a generic and descriptive sense only and not for purposes of limitation. Persons skilled in the art will appreciate that the present invention is not limited to what has been particularly shown and described hereinabove. Rather the scope of the present invention is defined only by the claims, which follow.

We claim:

1. A method for capturing and analyzing customer interactions with an agent, comprising:

pre-processing at least two interaction information units using audio analysis for at least one of the at least two interaction information units, extracting content data items from the at least two interaction information units;

storing the content data items in a content data item database;

selectively analyzing the at least one of the at least two interaction information units suitable for further analysis by applying content analysis rules on said content data items, including non-text based analysis rules by a rule based content analysis engine;

classifying the content data items from the at least two interaction information units into at least two user-defined categories, by matching at least one of the content data items against the at least two user-defined categories and associating the at least one of the content data items with a suitable category of the at least two user-defined categories, the at least two user-defined categories defined in accordance with at least one word combined with a screen event or with a CRM entry that occurred substantially at the time the at least one word was used;

using the rules to look for pre-defined combinations of specific keywords, emotion levels or talk behavior; and notifying the agent by providing a coaching statement to a computing device used by the agent when a pre-defined combination is found.

2. A method according to claim 1, further comprising using analysis results in at least one usage selected from the group consisting of: a quality management application for evaluating agents' performance, said quality management application employing quality management electronic evaluation forms, an e-learning application, a playback application, and a reporter or statistics application.

3. A method according to claim 1, wherein the pre-processing or analyzing includes at least one item selected form the group consisting of: a behavioral pattern identification, speaker identification, speaker verification, speaker separation, call flow analysis, excitement analysis, emotion analysis, screen events analysis, video analysis, speech recognition, word spotting, and optical character recognition (OCR).

4. A method according to claim 1, wherein at least one of the content data items is selected from the group consisting of: extracted text, a word, a phrase, an excitement level, an emotion level of a customer, an emotion level of an agent, an identified screen event, a behavioral pattern, a call flow parameter, a speaker identification, results of speakers separation or results of object analysis for video.

5. A method according to claim 1, wherein the analyzing uses at least one additional information source selected from the group consisting of: an interaction meta-data, an organization knowledge base, customer Relationship Management (CRM) information, and Computer Telephone Integration (CTI) information.

6. A method for capturing and analyzing customer interactions with an agent, comprising:

pre-processing at least two interaction information units using audio analysis for at least one of the at least two interaction information units, extracting content data items from the at least two interaction information units;

storing the content data items in a content data item database;

selectively analyzing the at least one of the at least two interaction information units suitable for further analysis by applying content analysis rules on said content data items, including non-text based analysis rules by a rule based content analysis engine;

classifying the content data items from the at least two interaction information units into at least two user-defined categories, by matching at least one of the content data items against the at least two user-defined categories and associating the at least one of the content data items with a suitable category of the at least two user-defined categories, the at least two user-defined categories defined in accordance with at least one word combined with a screen event or with a CRM entry that occurred substantially at the time the at least one word was used; and using the rules to automatically fill in quality management evaluation forms related to the performance of the agent.

7. A method according to claim 6, further comprising using analysis results in at least one usage selected from the group consisting of: a quality management application for evaluating agents' performance, said quality management application employing quality management electronic evaluation forms, an e-learning application, a playback application, and a reporter or statistics application.

8. A method according to claim 6, wherein the pre-processing or analyzing includes at least one item selected form the group consisting of: a behavioral pattern identification, speaker identification, speaker verification, speaker separation, call flow analysis, excitement analysis, emotion analysis, screen events analysis, video analysis, speech recognition, word spotting, and optical character recognition (OCR).

9. A method according to claim 6, wherein at least one of the content data items is selected from the group consisting of: extracted text, a word, a phrase, an excitement level, an emotion level of a customer, an emotion level of an agent, an identified screen event, a behavioral pattern, a call flow parameter, a speaker identification, results of speakers separation or results of object analysis for video.

10. A method according to claim 6, wherein the analyzing uses at least one additional information source selected from the group consisting of: an interaction meta-data, an organization knowledge base, customer Relationship Management (CRM) information, and Computer Telephone Integration (CTI) information.

11. A method for capturing and analyzing customer interactions with an agent, comprising:

pre-processing at least two interaction information units using audio analysis for at least one of the at least two interaction information units, extracting content data items from the at least two interaction information units;

storing the content data items in a content data item database;

selectively analyzing the at least one of the at least two interaction information units suitable for further analysis by applying content analysis rules on said content data items, including non-text based analysis rules by a rule based content analysis engine;

classifying the content data items from the at least two interaction information units into at least two user-defined categories, by matching at least one of the content data items against the at least two user-defined categories and associating the at least one of the content data items with a suitable category of the at least two user-defined categories, the at least two user-defined categories defined in accordance with at least one word combined with a screen event or with a CRM entry that occurred substantially at the time the at least one word was used; and using the rules to automatically update quality management evaluation forms to include particular questions related to the performance of the agent.

12. A method according to claim 11, further comprising using analysis results in at least one usage selected from the group consisting of: a quality management application for evaluating agents' performance, said quality management application employing quality management electronic evaluation forms, an e-learning application, a playback application, and a reporter or statistics application.

13. A method according to claim 11, wherein the pre-processing or analyzing includes at least one item selected form the group consisting of: a behavioral pattern identification, speaker identification, speaker verification, speaker separation, call flow analysis, excitement analysis, emotion analysis, screen events analysis, video analysis, speech recognition, word spotting, and optical character recognition (OCR).

14. A method according to claim 11, wherein at least one of the content data items is selected from the group consisting of: extracted text, a word, a phrase, an excitement level, an emotion level of a customer, an emotion level of an agent, an identified screen event, a behavioral pattern, a call flow parameter, a speaker identification, results of speakers separation or results of object analysis for video.

15. A method according to claim 11, wherein the analyzing uses at least one additional information source selected from the group consisting of: an interaction meta-data, an organization knowledge base, customer Relationship Management (CRM) information, and Computer Telephone Integration (CTI) information.

* * * * *